US008595056B2

(12) United States Patent
Sohya et al.

(10) Patent No.: US 8,595,056 B2
(45) Date of Patent: Nov. 26, 2013

(54) ADAPTIVE ISSUANCE OF PRIVILEGE INFORMATION IN MERCHANDISING AND ADVERTISING SYSTEMS

(75) Inventors: Toshio Sohya, Tokyo-to (JP); Hiroko Hoshina, Tokyo-to (JP); Motokazu Fukui, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1923 days.

(21) Appl. No.: 10/242,579

(22) Filed: Sep. 12, 2002

(65) Prior Publication Data

US 2003/0055726 A1 Mar. 20, 2003

(30) Foreign Application Priority Data

Sep. 14, 2001 (JP) ................................. 2001-279496

(51) Int. Cl.
*G06Q 30/00* (2012.01)

(52) U.S. Cl.
USPC ....................... 705/14.1; 705/14.24; 705/14.4

(58) Field of Classification Search
USPC .............................................. 705/14.1, 14.4
See application file for complete search history.

(56) References Cited

U.S. PATENT DOCUMENTS

| 4,674,041 A * | 6/1987 | Lemon et al. ............... 705/14.35 |
| 5,176,224 A * | 1/1993 | Spector ........................... 186/52 |
| 5,287,181 A * | 2/1994 | Holman ........................ 348/473 |
| 5,459,306 A * | 10/1995 | Stein et al. ..................... 235/383 |
| 6,024,288 A * | 2/2000 | Gottlich et al. ............... 235/493 |
| 6,110,044 A * | 8/2000 | Stern ............................... 463/29 |
| 6,321,208 B1 * | 11/2001 | Barnett et al. ............. 705/14.36 |
| 6,766,301 B1 * | 7/2004 | Daniel et al. ............... 705/14.26 |
| 2001/0014868 A1 * | 8/2001 | Herz et al. ........................ 705/14 |
| 2001/0014870 A1 * | 8/2001 | Saito et al. ...................... 705/14 |
| 2001/0027481 A1 * | 10/2001 | Whyel .......................... 709/218 |
| 2001/0037467 A1 * | 11/2001 | O'Toole et al. ............... 713/201 |
| 2001/0039514 A1 * | 11/2001 | Barenbaum et al. ............ 705/14 |
| 2001/0042008 A1 * | 11/2001 | Hull et al. ....................... 705/14 |
| 2001/0042010 A1 * | 11/2001 | Hassell .......................... 705/14 |
| 2001/0042014 A1 * | 11/2001 | Lowry et al. .................... 705/14 |
| 2001/0047296 A1 * | 11/2001 | Wyker ........................... 705/14 |
| 2001/0049627 A1 * | 12/2001 | Simpson ........................ 705/14 |
| 2002/0007337 A1 * | 1/2002 | Schade et al. .................. 705/37 |
| 2002/0032604 A1 * | 3/2002 | Watanabe et al. ............... 705/14 |
| 2002/0033597 A1 * | 3/2002 | Dixon et al. .................... 283/51 |
| 2002/0065720 A1 * | 5/2002 | Carswell et al. ................ 705/14 |
| 2002/0069404 A1 * | 6/2002 | Copeman et al. .............. 725/32 |

(Continued)

FOREIGN PATENT DOCUMENTS

| JP | 4294492 | 10/1992 |
| JP | 6052446 | 2/1994 |

(Continued)

*Primary Examiner* — Matthew T Sittner
(74) *Attorney, Agent, or Firm* — Schmeiser, Olsen & Watts, LLP; John Pivnichny

(57) ABSTRACT

An issuing system and an electronic advertisement management method which allow both users and issuers to exploit ticket information, privilege information, and additional information for coupons and numbered tickets. A user can receive a coupon issued by a coupon issuing device and exercise it at a coupon exercising terminal in a store to enjoy a privilege such as a discount. When a coupon is exercised at the coupon exercising terminal, the fact is communicated to a coupon issuance control server, which can alter subsequent coupons substantially in real time. Coupon discounts can be changed according to the coupon exercise status or exercise history for each user.

16 Claims, 19 Drawing Sheets

(56) References Cited

U.S. PATENT DOCUMENTS

| | | | |
|---|---|---|---|
| 2002/0069407 A1* | 6/2002 | Fagnani et al. | 725/35 |
| 2002/0091567 A1* | 7/2002 | Royston | 705/14 |
| 2002/0112159 A1* | 8/2002 | Platt | 713/168 |
| 2002/0156676 A1* | 10/2002 | Ahrens et al. | 705/14 |
| 2002/0178060 A1* | 11/2002 | Sheehan | 705/14 |
| 2003/0017865 A1* | 1/2003 | Beaulieu et al. | 463/16 |
| 2003/0023482 A1* | 1/2003 | Messner et al. | 705/14 |
| 2003/0032474 A1* | 2/2003 | Kaminkow | 463/25 |
| 2003/0055726 A1* | 3/2003 | Sohya et al. | 705/14 |
| 2003/0110097 A1* | 6/2003 | Lei | 705/27 |
| 2003/0163373 A1* | 8/2003 | Cornateanu | 705/14 |
| 2004/0210484 A1* | 10/2004 | Lee | 705/14 |
| 2004/0220854 A1* | 11/2004 | Postrel | 705/14 |
| 2004/0225578 A1* | 11/2004 | Hager et al. | 705/26 |
| 2005/0108096 A1* | 5/2005 | Burger et al. | 705/14 |
| 2007/0156529 A1* | 7/2007 | Walker et al. | 705/14 |
| 2008/0052169 A1* | 2/2008 | O'Shea et al. | 705/14 |
| 2008/0077498 A1* | 3/2008 | Ariff et al. | 705/14 |
| 2008/0097855 A1* | 4/2008 | Rissanen | 705/14 |
| 2011/0184779 A1* | 7/2011 | Mittal et al. | 705/7.31 |

FOREIGN PATENT DOCUMENTS

| | | |
|---|---|---|
| JP | 10240205 | 9/1998 |
| JP | 11175851 | 7/1999 |
| JP | 11346352 | 12/1999 |
| JP | 2000020823 | 1/2000 |
| JP | 2000250991 | 9/2000 |
| JP | 2001034658 | 2/2001 |
| JP | 2001184039 | 7/2001 |
| JP | 2001243312 | 9/2001 |
| JP | 10312415 | 11/2008 |
| WO | WO 0150398 A2 * | 7/2001 |

* cited by examiner

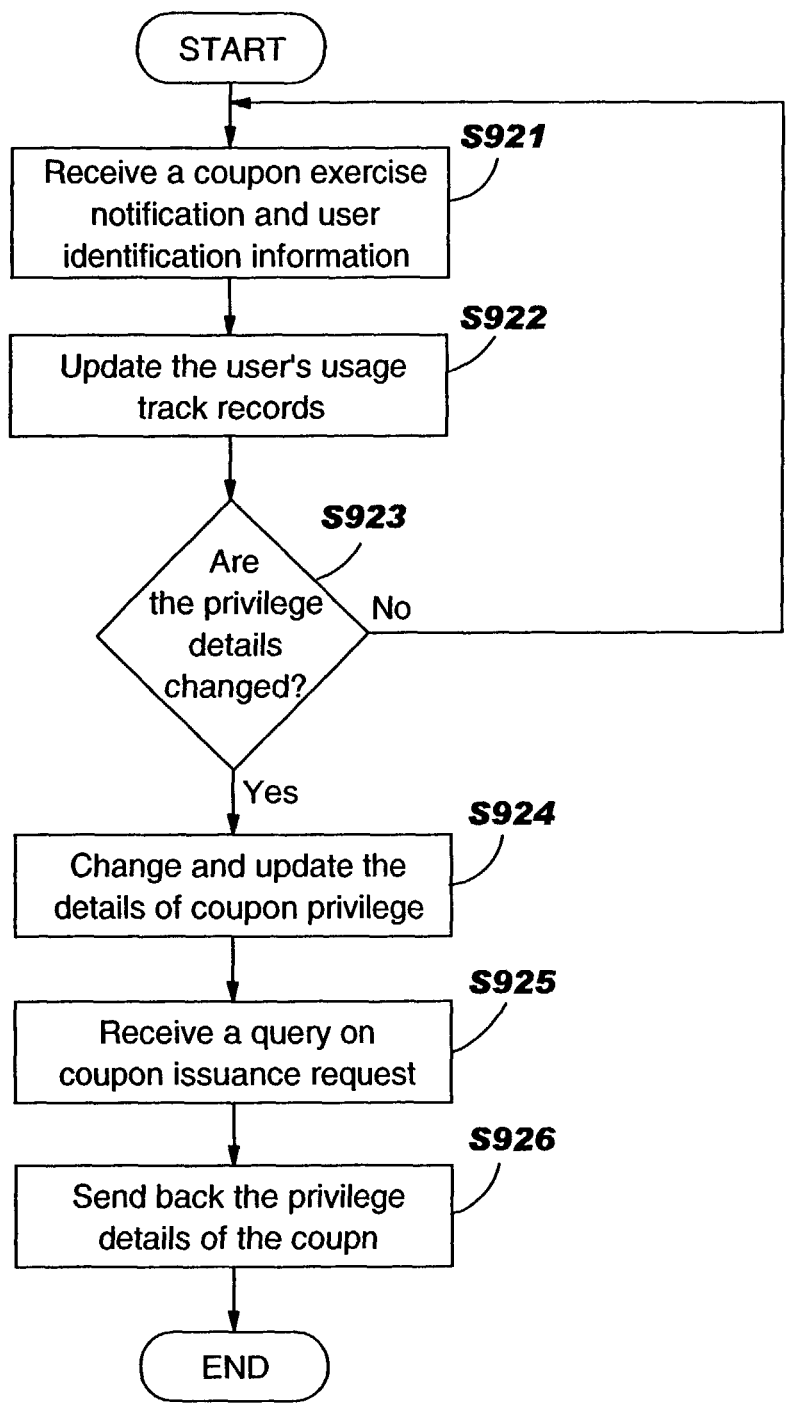

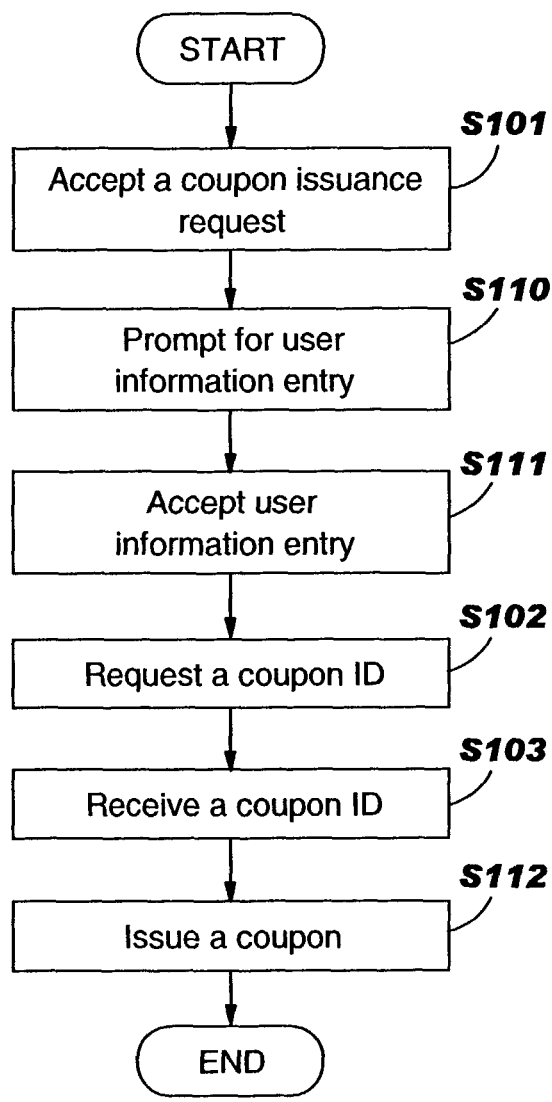

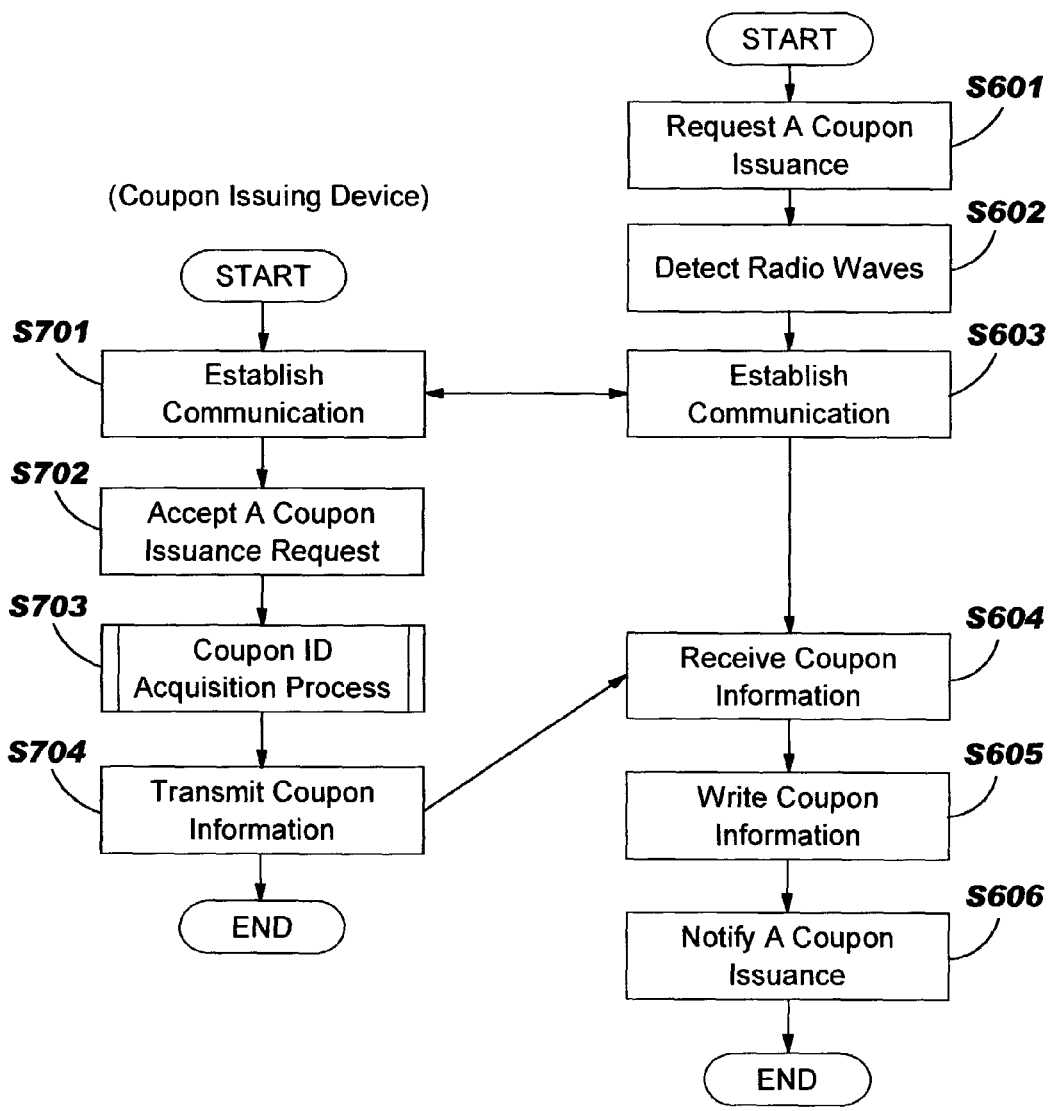

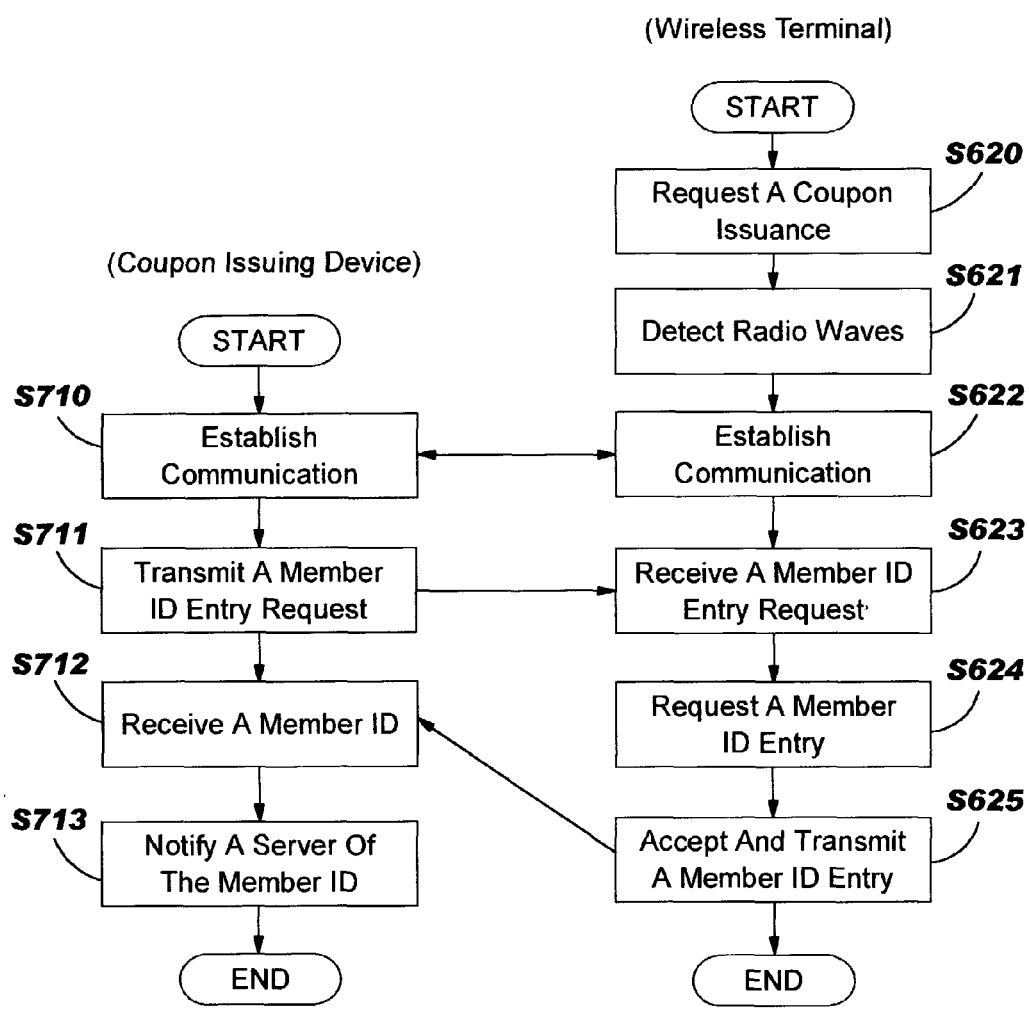

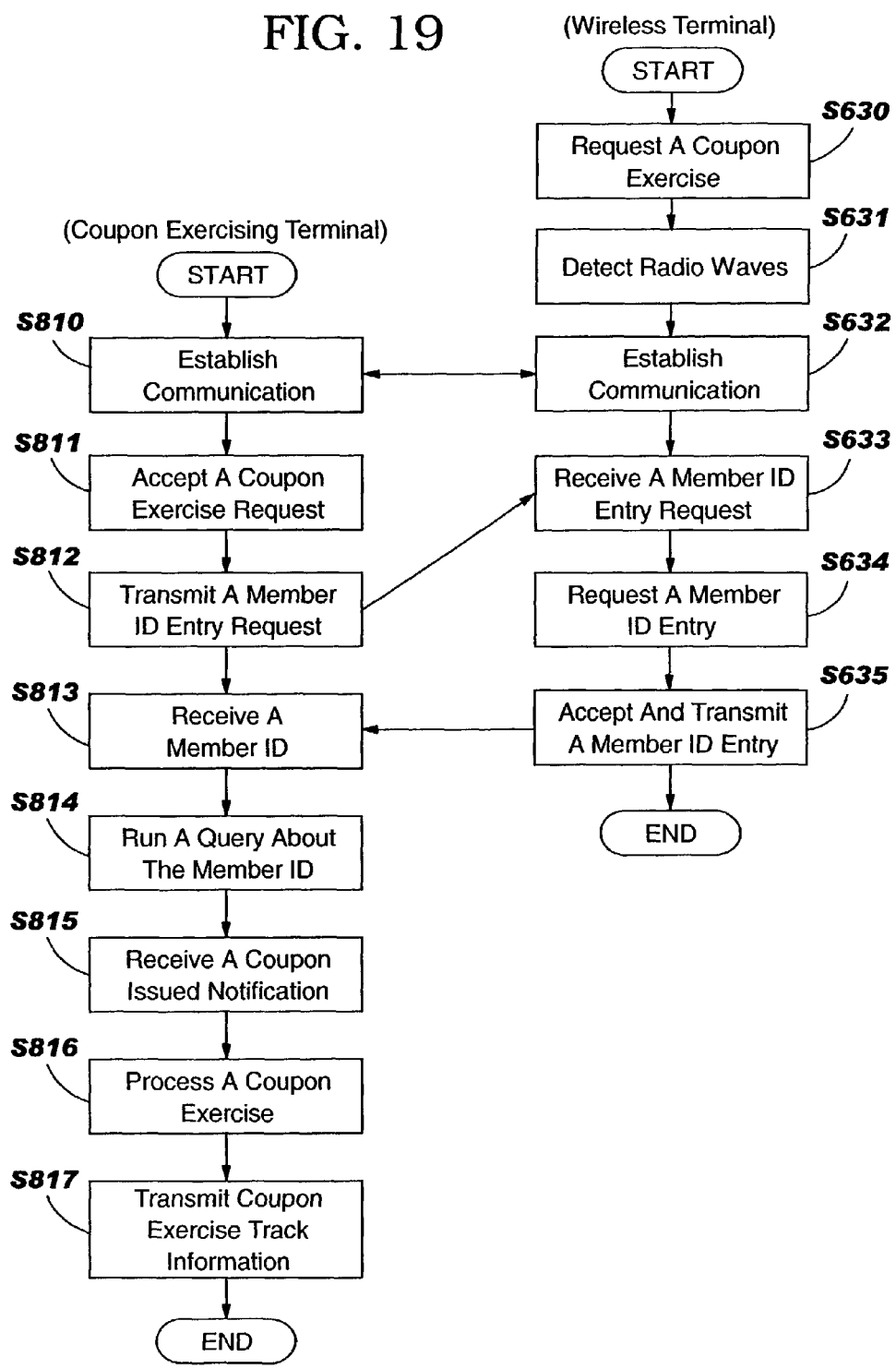

ADAPTIVE ISSUANCE OF PRIVILEGE INFORMATION IN MERCHANDISING AND ADVERTISING SYSTEMS

FIELD OF THE INVENTION

The present invention relates to a privilege information issuing system for coupons and an electronic advertisement management method.

BACKGROUND

It is well known that various advertisements have been conventionally used as means for attracting customers to a store. Advertising may take a wide variety of forms, including an advertisement in a newspaper or magazine, an advertising circular for a newspaper, and an advertising display on a street. More recent developments include a system to display advertisements on a lighting message board called an electronic advertising display, and a system to display advertisements on a website for access from a personal computer or cellular phone equipped with the functions of a terminal.

In order to attract more customers, a commonly used approach is to offer a discount on goods or services available from a store. For this purpose, the store may issue discount coupons to its customers.

Such discount coupons may be printed on an advertisement in a newspaper or magazine or an advertising circular for a newspaper so that a customer can cut the coupon out for use. Other discount coupons may be distributed on the streets, while yet other discount coupons may be displayed as contents on a home web page for printing by the customer.

Another service has been made available to some customers, wherein a customer accesses a particular website through a cellular phone that is equipped with functions of a terminal, downloads data usable as a coupon from the website and presents the downloaded data to the store's salesclerk to receive a discount.

When a store announces through the various advertising means described above that its goods or services are made available at a higher discount than usual in order to increase customer demand, the store may issue numbered tickets to prevent any confusion created by an influx of too many customers into the store. In this case, the customers visit the store to receive their numbered tickets before they can obtain the goods or services in order of ticket number.

However, it is difficult for those who employ the known advertising approaches to assess the advertising effectiveness of issuing coupons. Even if effectiveness is analyzed, the resulting information may show only the number of coupons actually used. In addition, such an analysis is time-consuming, which may make it difficult to change the coupon discount according to the sales of goods.

If the coupon discount is changed by the store, of course, such a change cannot be announced to those customers who are not in the store. Nor can such a change contribute directly to increased effectiveness in attracting customers. Thus, it is substantially impossible for the current systems to provide immediate and dynamic advertising effectiveness.

When numbered tickets are issued, some of the customers who received them may not visit the store to purchase the goods or services. This may create disadvantages to both the store and the customers. For example, although the store may suffer unsold goods, there is no way for customers who have not received the numbered tickets to know of such unsold goods.

These coupons and numbered tickets are issued by the advertiser to the customers in a one-way manner. Thus, the advertiser cannot analyze the advertising effectiveness from the viewpoint of marketing, in order to determine what types of customers used the coupons and numbered tickets.

If the advertiser asks customers to fill in their coupons with information (name, address, age, occupation, etc.), useful feedback information on the advertisement can be obtained. However, this requires time and effort, which customers find very troublesome. Therefore, this approach is not necessarily effective.

Thus, there is a need for a privilege information issuing system and an electronic advertisement management method which allow both the users and issuers to exploit useful ticket information, privilege information, and additional information for coupons and numbered tickets.

SUMMARY

A ticket information output control method according to the present invention comprises the step of issuing predetermined ticket information to a user who is a customer, the step of accepting the ticket information presented by the user to whom the ticket information is issued, and the step of controlling the issuance of subsequent ticket information based on the accepted ticket information.

The term ticket information used herein refers to the information necessary to function as, for example, a discount coupon for discounting an item or a numbered ticket for determining the order of purchasing goods, in a store which is the issuer of the ticket information. Here the term "coupon" will be used as a convenience to include both discount coupons and numbered tickets.

When the ticket information is issued, it can be readably printed on a coupon with character strings or symbols such as bar-codes and then issued to the user. Alternatively, the ticket information can be readably recorded on a recording medium having portability and memory capability, such as an IC card, a magnetic card, a cellular phone equipped with the functions of a terminal, or a personal digital assistant.

Thus, when the ticket information presented by the user is accepted, the character strings or symbols printed on the coupon or the ticket information data recorded on the recording medium can be read out by a reader, or the data recorded in the cellular phone or personal digital assistant can be displayed on its display as two-dimensional bar-codes and then read out by the reader for acceptance.

Alternatively, a salesclerk who can visually check the ticket information printed on a coupon may perform a predetermined operation, which can be regarded as the acceptance of the ticket information. When a device with a display such as a cellular phone is used as a recording medium, and a predetermined display is made based on the data of the ticket information recorded in the recording medium so that a salesclerk can visually check the ticket information, then the acceptance can be performed in a similar manner.

Then, based on the accepted ticket information, the issuance of subsequent ticket information is controlled. More specifically, the issuance itself of subsequent ticket information may be controlled or details of the ticket information may be changed depending on the acceptance status of the ticket information, that is, depending on the exercise status of the privilege information (coupon privilege) for a discount coupon or numbered ticket.

In the above-mentioned case, when the ticket information is provided to the user, an output (such as a display) of advertising contents for goods to which the ticket information is directed may be also provided to the user, but this is not essential to the present invention.

In a privilege information issuing system according to the present invention, privilege information output means provides the user with privilege information including predetermined information. When the user who receives the output presents the privilege information to exercise the coupon privilege, privilege information acceptance means receives the privilege information from the user. Next, based on the received privilege information, output control means controls subsequent privilege information outputs from the privilege information output means.

The term privilege information used herein refers to the information necessary to function as, for example, a discount coupon for discounting an item of goods or a numbered ticket for determining the order of purchasing goods.

To control the output of privilege information, the issuance of privilege information can be stopped when the accepted privilege information count, that is, the number of privilege exercises made by presenting the privilege information, reaches a given value. In addition, the details of privilege information can be changed when the privilege information count reaches a given value.

Moreover, user identification information for identifying the user who presented the privilege information may be acquired to change the details of privilege information based on previous usage track records of the user identified by the user identification information. In such a case, to acquire the user identification information, the system may accept the user input of user identification information when the privilege information is issued or the system may prompt the user to enter a member ID or other data as user identification information (the user's personal data) if the system has previously held personal data for the user. As the previous usage track records of the user, the number of privilege information exercises previously made by the user or the usage track records of a store or a credit card company which is the output requester of the privilege information may be used.

The present invention also includes a privilege information output terminal which provides privilege information at the request of the user. The privilege information output terminal acquires privilege detail information which depends on the usage of previously issued privilege information and then issues privilege information which includes the privilege detail information. Then, the terminal displays advertising contents associated with the privilege information on the contents display, and may also display the privilege details information on the details information display in conjunction therewith. In this case, the contents display and the details information display may be separate from each other or physically integrated into a single unit. Since, according to the present invention, the privilege detail information may be updated more frequently than the advertising contents, it is desirable that the privilege detail information data and the advertising contents data be processed separately from each other.

The privilege information output terminal can also comprise an information input for accepting the user's input of user information Accordingly, the terminal can issue privilege information which includes the input user information in conjunction with the privilege detail information. Namely, the privilege information which functions as a coupon may include user information of the user who exercises it.

An electronic advertising display system according to the present invention comprises a contents data holder for holding advertising contents data, an additional information data holder for holding additional information data associated with the advertising contents, an electronic advertising display for displaying advertising contents based on data transferred from the contents data holder, and an additional information output attached to the electronic advertising display for providing an additional information output based on data transferred from the additional information data holder.

The term additional information used herein refers to the information necessary to function as, for example, a discount coupon for discounting an item of goods or a numbered ticket for determining the order of purchasing goods. Such additional information may also be displayed on the electronic advertising display.

The present invention also includes a privilege information accepting terminal which accepts privilege information from a user when the user wants to enjoy the privilege based on the privilege information. The privilege information accepting terminal comprises a privilege information accepting section for accepting privilege information presented by the user, a process executor for executing a predetermined process, for example, a process to discount the price of an item of goods, depending on the accepted privilege information, and a notifying section for notifying an external server through a network that the privilege information is accepted.

The present invention also includes a privilege information output control server which controls the output of privilege information. Namely, the server holds privilege information data in a data holder and then provides an output of the data at a data output to an external issuing device which issues the privilege information to a user. After the output privilege information is issued to the user by the issuing device, the server acquires the user's exercise status of privilege information and causes a data updater to update details of the privilege information held in the data holder based on the exercise status. This allows the server to provide an output of privilege information data with updated details when a subsequent privilege information data output is performed by the data input.

When the privilege information is used for a numbered ticket, the data updater can invalidate the privilege information held in the data holder when the number of privilege information exercises reaches a given value. Namely, no valid privilege information will be provided thereafter.

When the privilege information is used for a discount coupon, the data updater can change the discount based on the accumulative exercise status of privilege information. For this purpose, the accumulative exercise status of privilege information may include the elapsed time since the exercise of privilege information began, in addition to the number of privilege information exercises.

The present invention also includes an electronic advertisement management method. In this method, advertising contents with privilege information of predetermined details attached thereto are displayed and some data on the privilege information is provided at the request of the user to be recorded on a recording medium. Then, when some data is acquired from the recording medium presented by the user, the privilege identified from the data is exercised. The details of privilege information to be attached to the advertising contents later are updated according to the exercise status of privilege information thus exercised.

In such a case, the advertising contents may be displayed on various electronic advertising displays provided on streets but the present invention applies as well to banner advertisements displayed on the display screen of a personal computer, a cellular phone, or a personal digital assistant.

Alternatively, after the advertising contents with privilege information of predetermined details attached thereto are displayed and at the user's request to exercise the privilege information, some information for identifying the user, such as the user's member ID, is acquired and stored in a predetermined server. The information for identifying the user may be acquired for query to the server also when the user exercises the privilege information, so that the user can exercise the privilege based on the privilege information after a query to see that the user has made the request to exercise the privilege information is complete.

BRIEF DESCRIPTION OF THE DRAWINGS

FIG. 6 shows the flow of process for changing the details of coupon privilege according to the user's history;

FIG. 8 shows the flow of process for issuing a coupon;

FIG. 16 shows the flow of process for issuing a coupon;

FIG. 18 shows the flow of process for issuing a coupon in a variation of the third embodiment; and FIG. 19 shows the flow of process for exercising a coupon in a variation of the second embodiment.

DETAILED DESCRIPTION

The present invention is described below in detail with reference to embodiments shown in the accompanying drawings.

Figure 1:
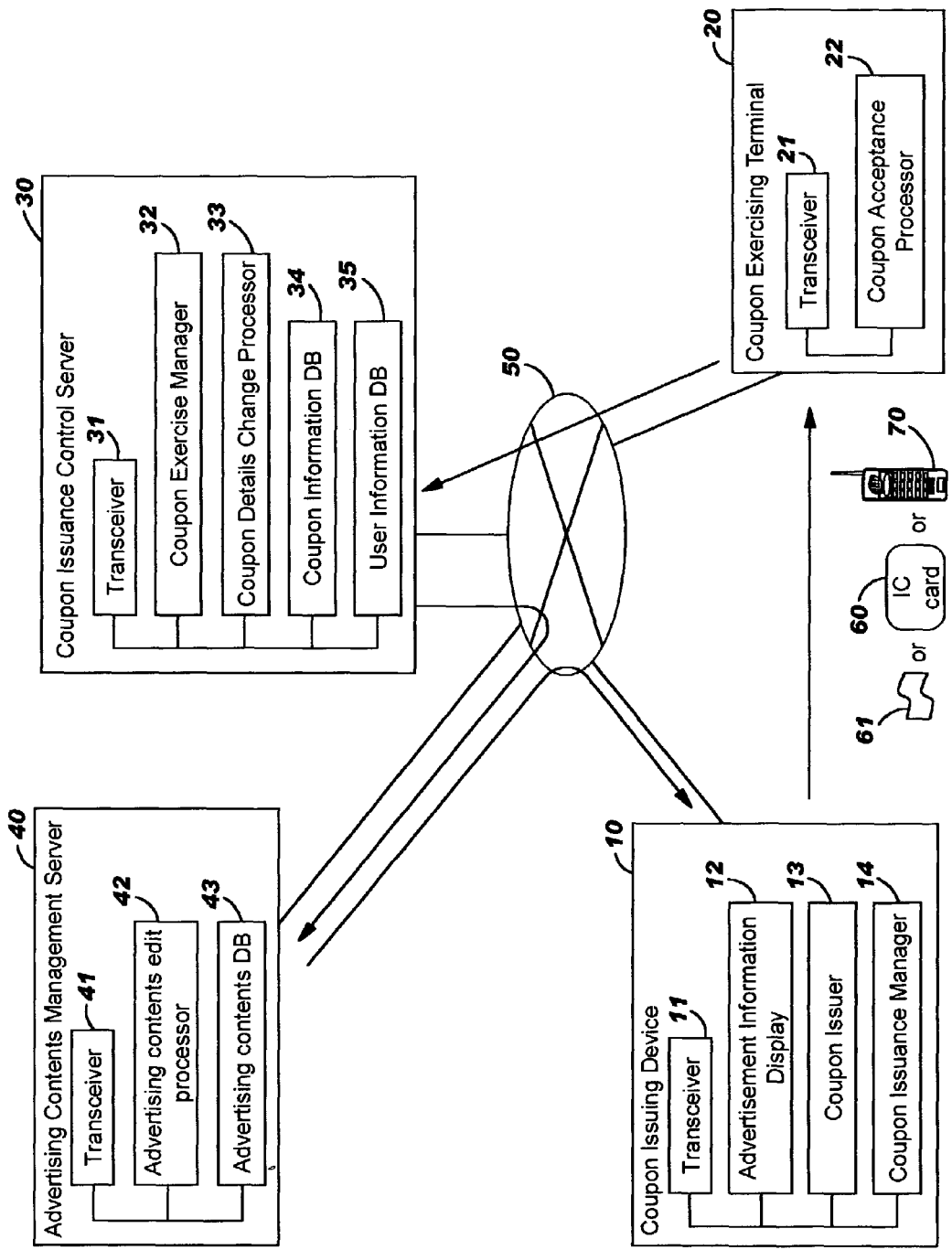
FIG. 1 shows the overall configuration of a coupon issuing system according to a first embodiment.

FIG. 1 shows the configuration of a coupon issuing system (a privilege information issuing system or an electronic advertising display system) according to an embodiment of the invention.

As shown in FIG. 1, this system comprises a coupon issuing device (a privilege information output means or a privilege information output terminal) 10, a coupon exercising terminal (a privilege information acceptance means or a privilege information accepting terminal) 20, a coupon issuance control server (an output control means, an external server, a privilege information output control server) 30, and an advertising contents management server 40, all of which may be connected through a network 50 such as the Internet or a wide area network (WAN).

The coupon issuing device 10 may be located on a street or in a convenience store to issue a coupon to a user. In this embodiment, a physical ticket 61 with predetermined information described on paper or other equivalent sheet material is issued by the coupon issuing device 10 as a coupon (ticket information, privilege information, or additional information).

The coupon issuing device 10 comprises a transceiver 11 for transmitting/receiving data to/from the network 50, an advertisement information display (contents display, details information display, or electronic advertising display) 12 made, for example, of a lightning message board or liquid crystal display for displaying advertising contents received from the advertising contents management server 40 through the network 50, a coupon issuer (privilege information output or additional information output) 13 for issuing as a coupon the ticket 61 with predetermined information, and a coupon issuance manager (details information acquirer) 14 for managing the number of coupons to be issued by the coupon issuer 13 and printed information.

The coupon exercising terminal 20 is typically provided in a store where the user can exercise the coupon ticket 61 issued by the coupon issuing device 10, and is typically integrated with a cash register or provided in the vicinity thereof. The coupon exercising terminal 20 comprises a transceiver (notifying section) 21 for transmitting/receiving data to/from the network 50 and a coupon acceptance processor (privilege information accepting section or process executor) 22 for accepting a coupon presented by the user.

The coupon acceptance processor 22 may accept a predetermined button operation performed by a salesclerk who checks the coupon ticket 61 presented by the user so that a predetermined process is performed to allow for utilization of the coupon. Alternatively the coupon acceptance processor 22 may read bar-codes described on the coupon ticket 61 to accept the utilization of the coupon and then perform a predetermined process. The predetermined process described herein includes a process of discounting prices by means of coupons or a process of counting sold goods if the coupons are used as numbered tickets. The coupon acceptance processor 22 transmits to the coupon issuance control server 30 through the transceiver 21 a notification that the coupon has been accepted.

The coupon issuance control server 30 functions as output control means, an external server, or a privilege information output control server and comprises a transceiver (data output) 31 for transmitting/receiving data to/from the network 50, a coupon exercise manager (information acquirer) 32 for managing coupons issued by the coupon issuing device 10 or actually exercised coupons, a coupon details change processor (data updater) 33 for changing details of a newly-issued coupon (privilege details information) according to the number of exercised coupons based on a predetermined algorithm, a coupon information database (DB) (additional information data holder or data holder) 34 for storing information on issued or exercised coupons, and a user information DB 35 for storing information on a user who exercises a coupon.

There is no requirement to include the user information DB 35 within the coupon issuance control server 30, and it may be implemented as, for example, a separate server. Communication between this separate server and the coupon issuance control server 30 through the network 50 does not preclude implementation of equivalent functions.

The advertising contents management server 40 comprises a transceiver 41 for transmitting/receiving data to/from the network 50, an advertising contents edit processor 42 for editing advertising contents to be displayed on the advertisement information display 12 of the coupon issuing device 10 and details of a coupon to be issued in conjunction with the advertising contents, and an advertising contents DB (contents data holder) 43 for storing advertising contents data.

Figure 2:
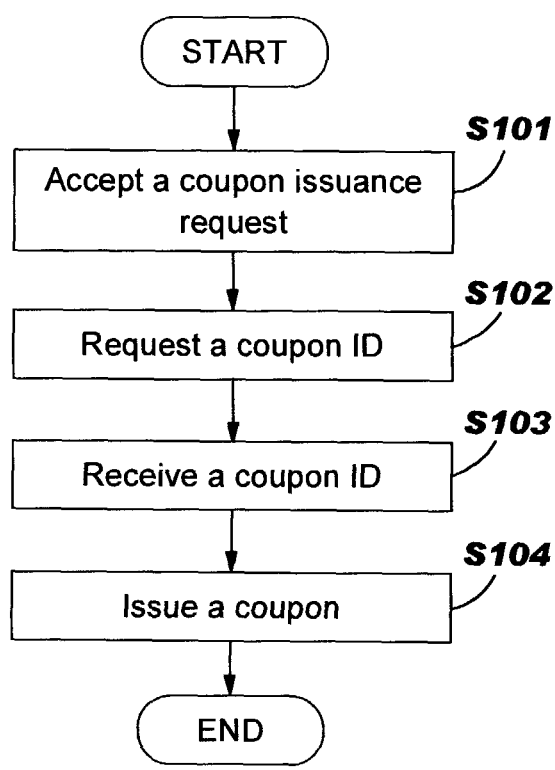
FIG. 2 shows the flow of process for issuing a coupon in the first embodiment.

FIG. 2 shows the flow of process for issuing a coupon at the coupon issuing device 10 in the coupon issuing system as described above.

First, when a user who sees an advertisement displayed on the advertisement information display 12 wants the coupon issuing device 10 to issue a coupon, the user operates a predetermined switch (not shown) provided for the coupon issuing device 10 or a user interface (not shown) on a telephone terminal connected to the coupon issuing device 10, for example connected through a short-distance radio link.

When the predetermined switch or user interface is operated, the coupon issuing device 10 understands that it has received a request to issue a coupon, and then accepts the request (step S101). Next, the coupon issuance manager 14 instructs, through the network 50, the coupon issuance control server 30 to issue a coupon ID (step S102). A coupon ID is uniquely granted to each coupon issued by the coupon issuing device 10 (which is not necessarily provided at a single location and may be provided at several locations) and typically includes a serial number or an alphanumerical character string. When the coupon issuance control server 30 receives this instruction, it causes the coupon exercise manager 32 to issue a coupon ID and transmits it to the coupon issuing device 10 through the network 50.

When the coupon issuing device 10 receives the coupon ID from the coupon issuance control server 30 (step S103), the coupon issuance manager 14 attaches to the coupon ID some information such as a coupon issuance time and an issuing location (which may be an ID uniquely granted to the coupon issuing device 10). The coupon issuer 13 then issues a coupon ticket with the information printed thereon (step S104). It is preferable that the information such as coupon IDs, coupon issuance times, and issuing locations be translated into barcodes, optical character reader (OCR) compatible characters, or other appropriate codes or symbols and printed out so that it can be read out by the coupon exercising terminal 20.

Then, the user receives the coupon ticket issued by the coupon issuing device 10 in this manner and visits a store where this coupon is valid to exercise it.

Figure 3:
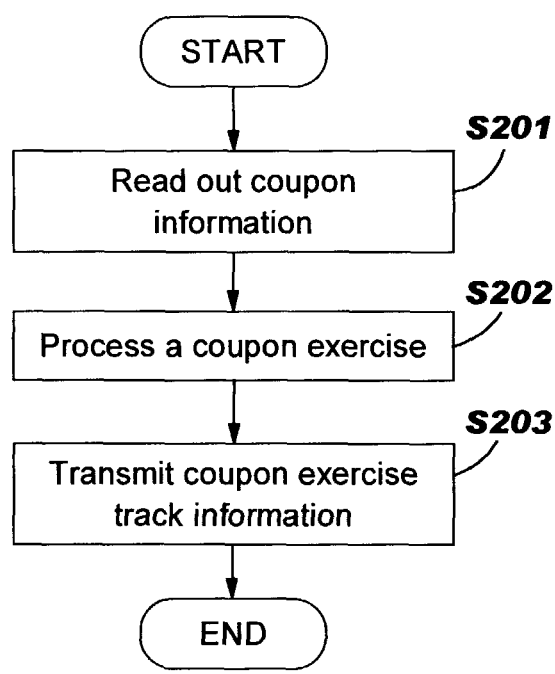
FIG. 3 shows the flow of process for exercising a coupon.

FIG. 3 shows the process when the user exercises a coupon in a store.

When the user presents the coupon ticket 61 to a salesclerk during the payment for goods, the salesclerk operates the coupon exercising terminal 20 provided in addition to a cash register to cause its reader such as a bar-code reader or OCR to read out the coupon ID, coupon issuance time, issuing location, and other information described on the ticket 61. Alternatively, the salesclerk may visually check the coupon ID, coupon issuance time, issuing location, and other information described on the coupon ticket 61 and enter them into the coupon exercising terminal 20 through key entry or other input means (step S201).

Next, the coupon acceptance processor 22 determines whether the coupon is valid. If the coupon is valid, the processor 22 recognizes that the coupon has been exercised and directs the cash register to perform a predetermined process such as a process to discount the price of an item of goods (step S202). Alternatively, after the coupon acceptance processor 22 determines whether the coupon is valid, it may provide a visual or audio indication of the result to the salesclerk so that upon receipt of it, the salesclerk can operate the cash register to perform a predetermined discount process.

In addition, the coupon acceptance processor 22 transmits, as coupon exercise track information, the coupon ID, coupon issuance time, issuing location, and other coupon information read out from the coupon ticket 61 as well as other information on the item of goods the user purchased if necessary to the coupon issuance control server 30 through the network 50 (step S203).

The coupon issuance control server 30 causes the coupon details change processor 33 to count the number of exercised coupons. At the same time, the coupon issuance control server 30 stores a history of the coupon exercise track information transmitted by the coupon exercising terminal 20 in the coupon information DB 34 to use as a previous usage track record, a usage track record of previously issued privilege information, or utilization data when further coupons are issued later.

The coupon issuance control server 30 may perform any of the operations described below for the following examples according to the number of coupons exercised by the coupon exercising terminal 20 as described above.

Figure 4:
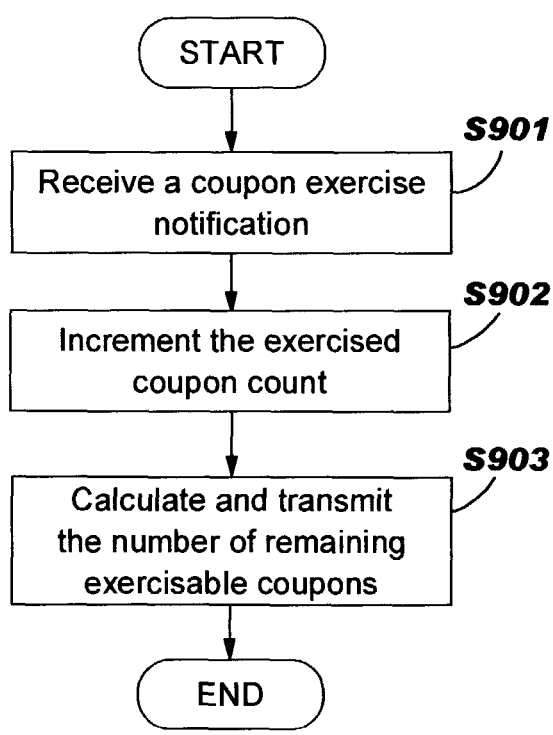
FIG. 4 shows an exemplary process performed according to the exercise status of a coupon and the flow of process for using the coupon as a numbered ticket.

Using a Coupon as a Numbered Ticket:

As shown in FIG. 4, each time the coupon issuance control server 30 receives from the coupon exercising terminal 20 a notification that a coupon has been exercised as a numbered ticket (step S901), it causes the coupon details change processor 33 to increment an exercised coupon count (step S902). The coupon issuance control server 30 holds a preset exercise estimate data of numbered tickets in the coupon information DB 34 and the coupon details change processor 33 subtracts the exercised coupon count from the exercise estimate, thereby calculating the number of remaining exercisable coupons. Then, the coupon details change processor 33 causes the coupon information DB 34 to reflect the calculated number of remaining exercisable coupons and transmits this data to the advertising contents management server 40 through the network 50 (step S903).

When the advertising contents management server 40 receives the number of remaining exercisable coupons, it causes the advertising contents edit processor 42 to edit advertising contents to be displayed to the user thereafter, if necessary, so that the number of remaining exercisable coupons can be displayed in association therewith.

Then, the edited advertising contents are reflected in the advertising contents DB 43 and transmitted to the coupon issuing device 10 through the network 50.

Based on the received advertising contents, the coupon issuing device 10 can include some information to the effect that x units of this item are still available at the particular time or that the number of sold units reached an estimate for this item, in the advertising contents to be displayed on the advertisement information display 12.

In this way, at a location where the coupon issuing device 10 is provided, the user can obtain information as to whether a desired item is available, without the need for going to a showcase in the store where that item is located. When using conventional numbered tickets, ordinary users can have information on the number of issued tickets only and cannot know that some users received their numbered tickets but have not purchased the goods. However, with the configuration described above, the user can obtain information about the coupon exercise status substantially in real time when the user receives an issued coupon.

Changing Details of Coupon Privilege According to the Coupon Exercise Status:

In the example described below, details of coupon privilege may be changed, for example, by gradually increasing a discount on an item of goods, according to the coupon exercise status.

Figure 5:
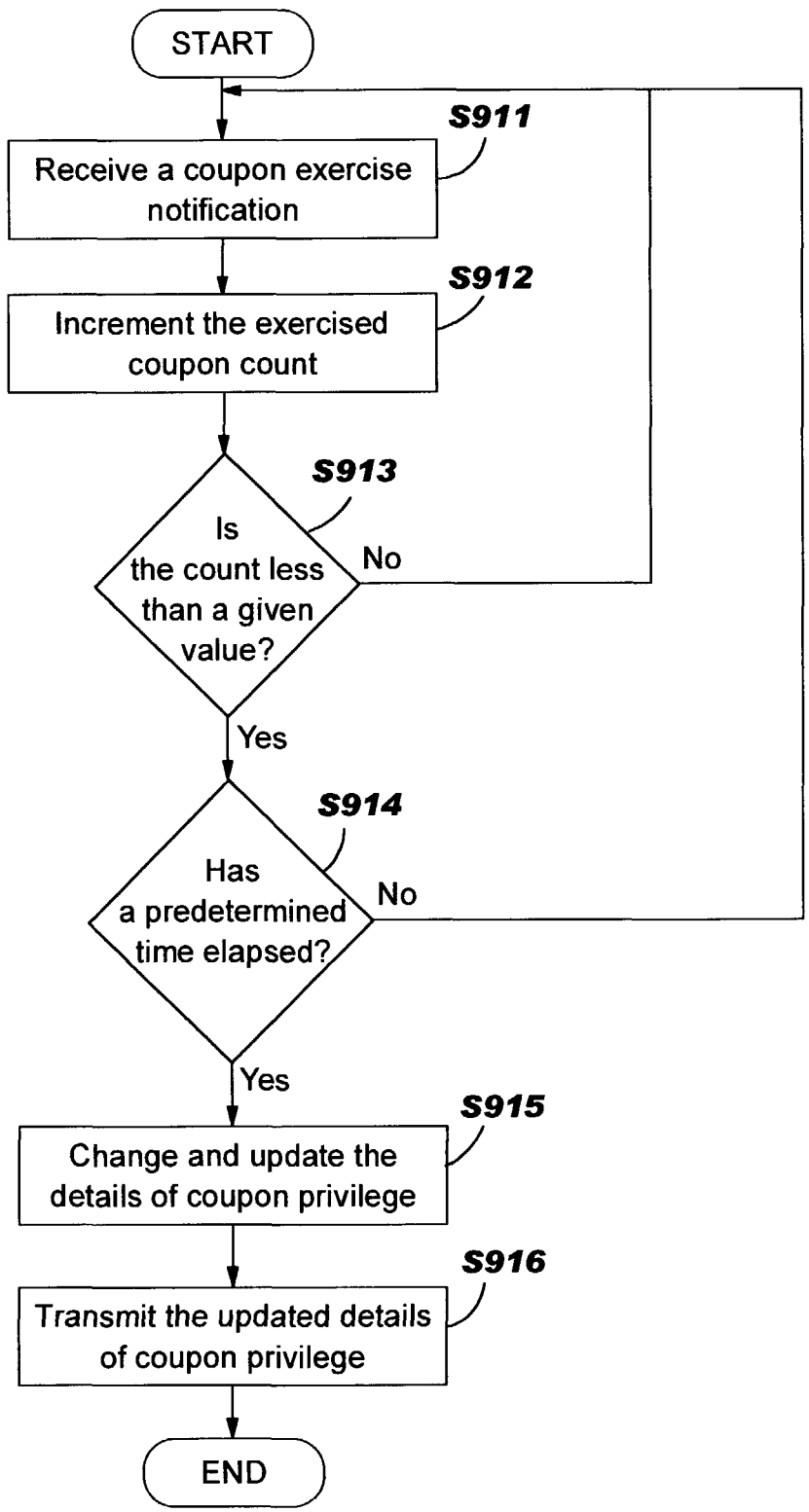
FIG. 5 shows the flow of process for changing the details of coupon privilege according to the exercise status of a coupon.

As shown in FIG. 5, each time the coupon issuance control server 30 receives from the coupon exercising terminal 20 a notification that a coupon has been exercised, it causes the coupon details change processor 33 to increment the exercised coupon count (steps S911 to S912). At the same time, the coupon details change processor 33 may acquire temporal information such as a time of day when the coupon is exercised and an elapsed time since the issuance of coupons began.

Based on a program describing a predetermined rule, the coupon issuance control server 30 causes the coupon details change processor 33 to update the details of coupon privilege based on the coupon count and the accumulative exercise status such as the coupon exercise time of day or elapsed time when a predetermined condition is met.

More specifically, for example, if the number of exercised coupons does not reach a given value when a predetermined time has elapsed since the issuance of coupons began, the discount may be increased (steps S913 to S915).

Such a rule for updating the coupon privilege details may be appropriately predetermined from the viewpoint of business and the present specification does not intend to limit the invention to a specific rule.

When the coupon details change processor 33 updates the details of coupon privilege, it reflects this update in the coupon information DB 34 and transmits this data to the advertising contents management server 40 through the network 50 (step S916).

When the advertising contents management server 40 receives the new details of coupon privilege, it causes the advertising contents edit processor 42 to edit advertising contents to be displayed to the user thereafter, if necessary, so that the new details of coupon privilege can be displayed in association therewith.

Then, the edited advertising contents are reflected in the advertising contents DB 43 and transmitted to the coupon issuing device 10 through the network 50.

Based on the received advertising contents, the coupon issuing device 10 can include some information to the effect, for example, that the discount changes from x % to y % from now on, in the advertising contents to be displayed on the advertisement information display 12.

In such an example, customers can be increasingly attracted to the store by increasing the discounts on items according to their sales, resulting in more reliable sales. Another service of beginning to offer higher discounts at a specific time or "time service", can be easily performed by the above-mentioned system.

Changing Details of a Coupon According to the User's Coupon Exercise History:

In this example, details of a coupon to be issued to each user are changed according to usage track records or histories (accumulative exercise status) such as the coupon issuance or exercise history for the user or the purchase history for a group to which the coupon is to be issued.

For this purpose, the usage track records such as the user's coupon issuance or exercise history or purchase history are associated with some information for identifying the user, for example, the user's member ID or credit card number and then stored in the user information DB 35 of the coupon issuance control server 30.

When a coupon is exercised at the coupon exercising terminal 20, some information identifying the user is read out from, for example, a membership card or credit card presented by the user.

Alternatively, if the coupon includes some user information as described later, the coupon exercising terminal 20 may read out from the coupon some information identifying the user. Then, as shown in FIG. 6, the coupon exercising terminal 20 notifies the coupon issuance control server 30 that the coupon has been exercised, and at the same time transmits that information identifying the user (step S921).

Each time the coupon issuance control server 30 receives from the coupon exercising terminal 20 the notification that the coupon has been exercised and the information identifying the user, it causes the coupon details change processor 33 to update the usage track records such as the coupon issuance or exercise history or purchase history in the data stored in the user information DB 35 and associated with the user (step S922).

Based on a program describing a predetermined rule, the coupon issuance control server 30 may have previously established several levels of coupon privilege according to the user's usage track records. This allows determination of privilege details for the user according to the user's usage track records. If the privilege level is increased as the user's usage track records are accumulated, the changed details of coupon privilege are stored in the coupon information DB 34 in association with the information identifying the user, and the related data is updated (steps S923, S924).

In such a case, unlike the two examples described above, the coupon issuing device 10 runs a query to the coupon issuance control server 30 through the network 50 when the user enters the user's member ID into the coupon issuing device 10 to request the issuance of a coupon. To respond the query, the coupon issuance control server 30 sends back the privilege details of a coupon to be issued to the user to the coupon issuing device 10 through the network 50 (steps S925, S926). The coupon issuing device 10 will then issue a coupon with the received privilege details to the user.

With the configuration described above, a user who sees an advertisement displayed on the advertisement information display 12 can receive an issued coupon from the coupon issuing device 10 and exercise it at the coupon exercising terminal 20 in a store to enjoy a particular privilege such as discounts or to use as a numbered ticket.

When a coupon is exercised at the coupon exercising terminal 20, the fact is communicated to the coupon issuance control server 30, which can reflect the present exercise to subsequent coupons substantially in real time. For example, if the coupon is used as a numbered ticket, the user can know the number of remaining units for a desired item in real time when the user receives the coupon.

When the details of a coupon are changed according to the coupon exercise status, for example, as a user service, different discounts can be offered at different times or a higher discount can be offered to attract customers, when coupon utilization is unsatisfactory, resulting in coupon usage beneficial to both the user and the store.

In addition, the details of a coupon can be changed according to each user's exercise history. Then, as the user exercises more coupons, the user can be given higher priority or enhanced services. The store also can increase its prospects for keeping good customers.

In the embodiment described above, a ticket 61 which has predetermined information recorded thereon is used as a coupon. This coupon can also record some information on a user for another system configuration. In the latter case, the coupon issuing system has a similar basic configuration to that shown in FIG. 1. Consequently, only differences from the above-described first embodiment will be described in the following, and common components to those in the figure will be denoted with the same reference numerals but will not be described in detail hereafter.

Figure 7A:
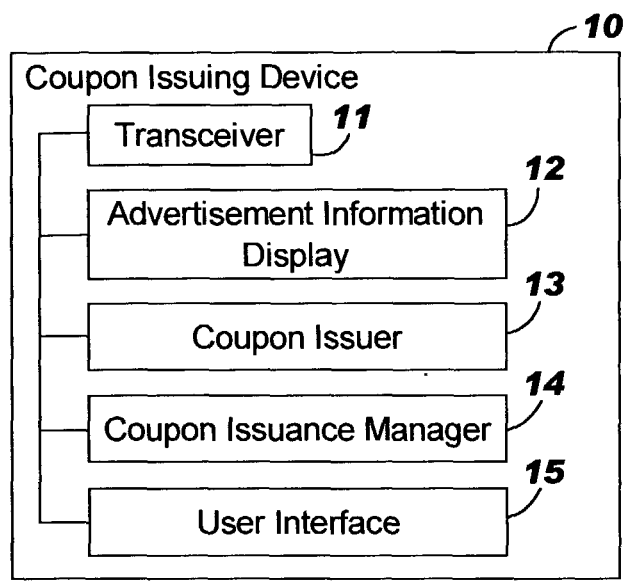
FIG. 7 shows the configuration of a coupon issuing device and a coupon exercising terminal in a variation of the first embodiment.

As shown in FIG. 7A, a coupon issuing device 10 is provided with a user interface (information input) 15 such as buttons or a keyboard for the user to enter the user's information, so that the coupon issuing device 10 can issue a coupon with the information entered by the user.

Figure 7B:
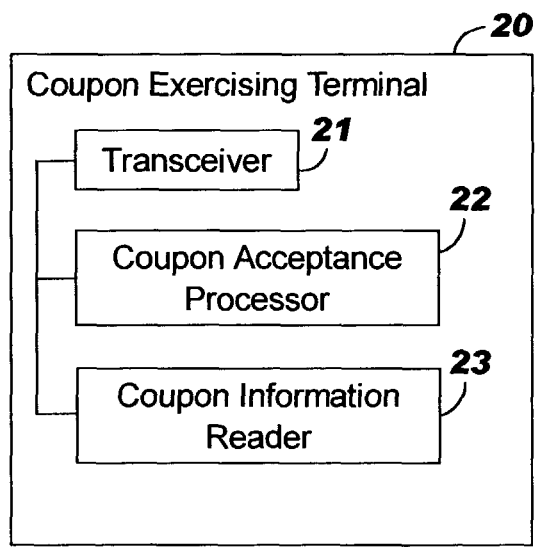

As shown in FIG. 7B, the coupon exercising terminal 20 further comprises a coupon information reader 23 which consists of a bar-code reader or other reader to read out various types of information recorded on a coupon.

As shown in FIG. 8, when a user makes a coupon issue request to the coupon issuing device 10, the coupon issuing device 10 accepts the coupon issue request (step S101) and prompts the user to enter user information, that is, information on the user (step S110). Such user information may be appropriately established, taking into account which information the coupon issuing system needs, how much the user is inconvenienced, and how reluctant the user feels about entering it. For example, such user information may be not only direct user information such as the user's name, address, and telephone number, all of which can uniquely identify the user, but also indirect user information such as the user's age, gender, habitat district and zip code (a district where the user's office or school is located), and questionnaire-like information to acquire the user's inclination for a particular item or service, none of which need necessarily identify the user. Such a prompt for user entry may be issued by providing a visual or audio indication of entries at the coupon issuing device 10.

When the prompted user enters predetermined information through the user interface 15, the coupon issuing device 10 accepts it (step S111).

Next, as in the first embodiment described above, the coupon issuing device 10 requests the coupon issuance control server 30 to issue a coupon ID (step S102) and upon receipt of an issued coupon ID (step S103), causes the coupon issuer 13 to issue a coupon to the user (step S112).

Then, the coupon issuer 13 attaches to the coupon the user-entered user information in addition to some coupon information such as the coupon ID, a coupon issuance time, and an issuing location.

Figure 9:
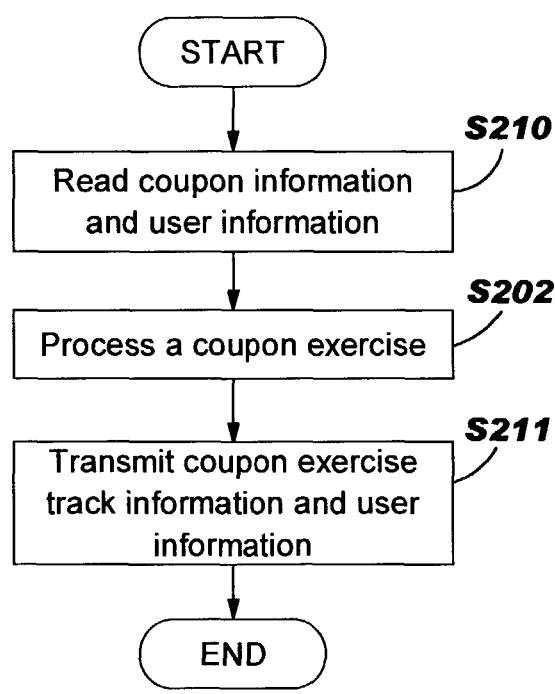
FIG. 9 shows the flow of process for exercising a coupon.

When the user exercises the coupon thus issued by the coupon issuing device 10, as shown in FIG. 9, the coupon exercising terminal 20 causes the coupon information reader 23 to read the coupon information such as the coupon ID, coupon issuance time, and issuing location described on the ticket 61 as well as the user information (step S210).

Next, as in the first embodiment described above, the coupon acceptance processor 22 performs a coupon exercise process and directs the cash register to perform a predetermined process such as provide a discount on an item (step S202).

Then, the coupon acceptance processor 22 transmits to the coupon issuance control server 30 through the network 50 the user-entered user information in addition to the coupon information and the coupon exercise track information consisting of information on items the user purchased (step S211).

The coupon issuance control server 30 stores the information transmitted by the coupon exercising terminal 20 into the coupon information DB 34.

In this example, the user information can be carried by the coupon, so that the coupon exercising system can acquire the user information. This allows for analysis of customers who exercised coupons, which analysis may be utilized for subsequent issuance of coupons.

Another embodiment according to the present invention will be described below. As an example of this embodiment, the coupon is implemented by a smart card which may be used as a cash card, credit card, commuter ticket, or other card-like medium. In this embodiment, the coupon issuing system has a similar basic configuration to that of the first embodiment described above. Consequently, the configuration necessary for use of a smart card as a coupon will be described in the following description, wherein components similar to those of the first embodiment will be denoted with the same reference numerals but will not be described in detail.

As shown in FIG. 1, the coupon issuing system according to this embodiment comprises a coupon issuing device 10, a coupon exercising terminal 20, a coupon issuance control server 30, and an advertising contents management server 40, all of which can be connected through a network 50.

Figure 10A:
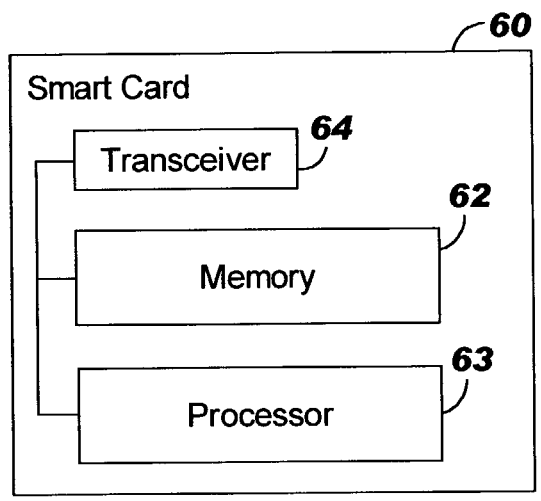
FIG. 10 shows the configuration of an IC card, a coupon issuing device, and a coupon exercising terminal in a second embodiment.

As shown in FIG. 10A, a smart card (recording medium with portability) 60 which the user possesses is, for example, of noncontact type, and it comprises a transceiver 64 including a built-in antenna, a memory 62 for storing data, and a processor 63 for performing a data read/write process for the memory 62.

Figure 10B:
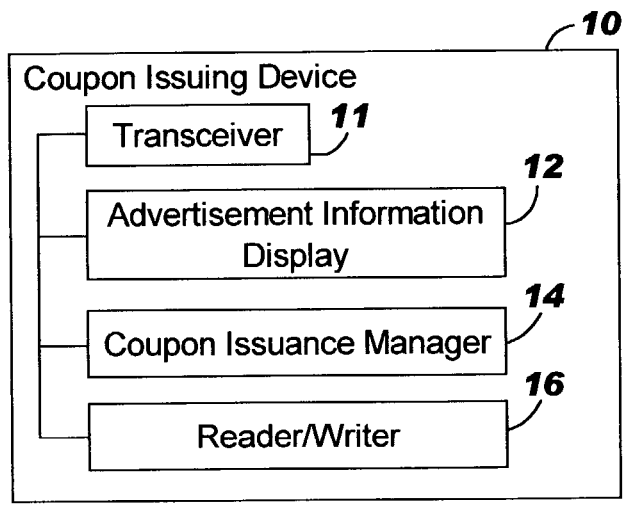

As shown in FIG. 10B, the coupon issuing device 10 further comprises a noncontact reader/writer 16 for writing predetermined information into the memory 62 of the smart card 60 as a coupon, in addition to a transceiver 11, an advertisement information display 12, and a coupon issuance manager 14.

Figure 10C:
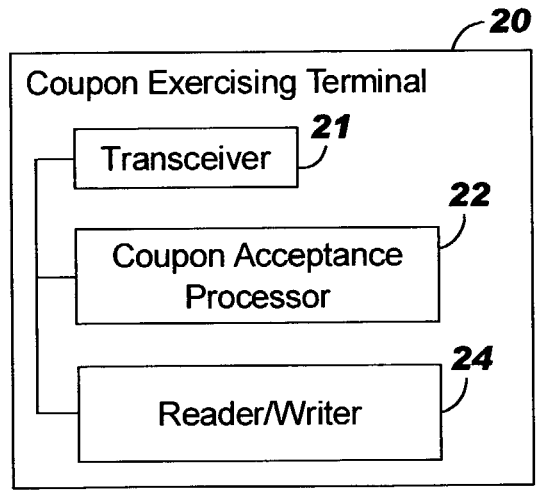

As shown in FIG. 10C, the coupon exercising terminal 20 further comprises a noncontact reader/writer 24 for reading/writing information from/to the memory 62 of the smart card 60, in addition to a transceiver 21 and a coupon acceptance processor 22.

Figure 11:
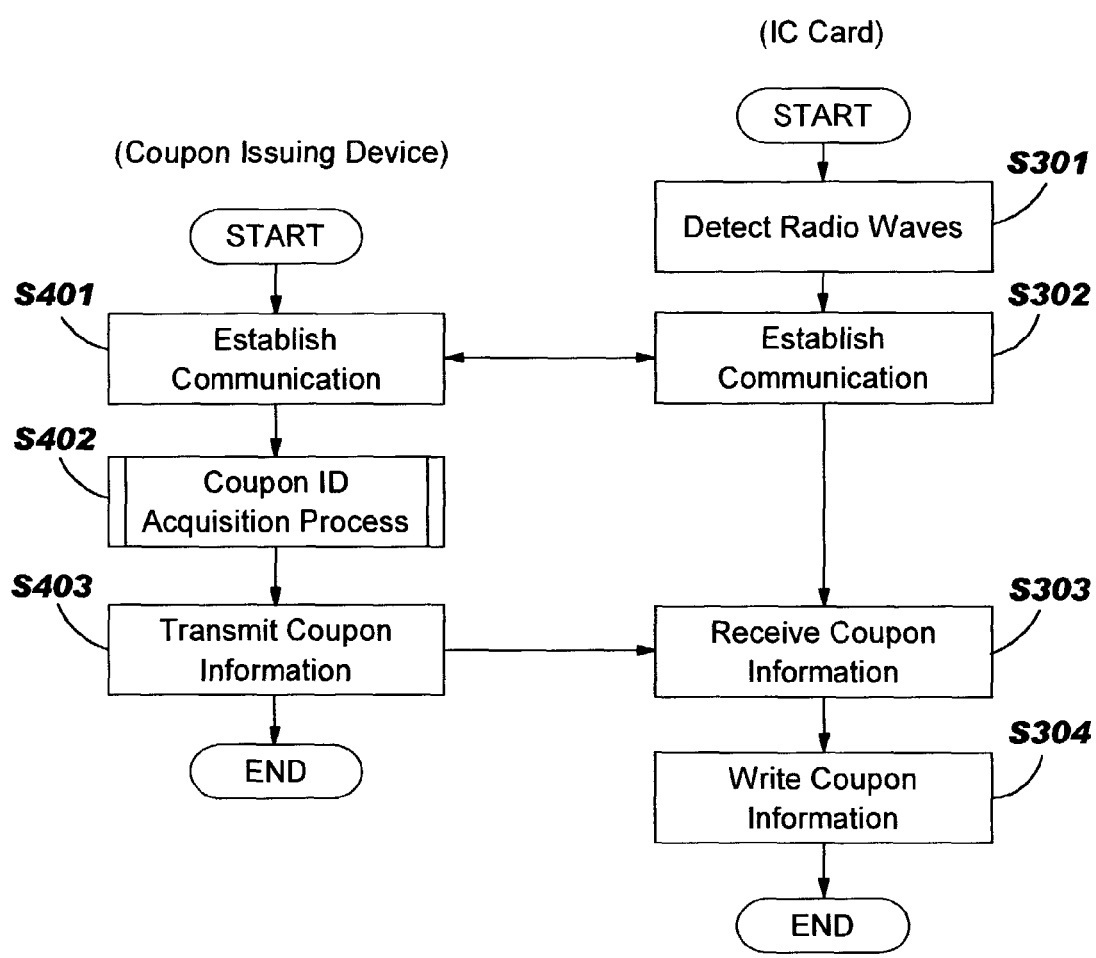
FIG. 11 shows the flow of process for issuing a coupon.

FIG. 11 shows a process for issuing a coupon at the coupon issuing device 10 in the coupon issuing system as described above. When a user who sees an advertisement displayed on the advertisement information display 12 wants the coupon issuing device 10 to issue a coupon, the user brings the user's own smart card 60 close to the reader/writer 16 of the coupon issuing device 10.

In the coupon issuing device 10, an antenna provided as the transceiver 11 continuously emits radio waves, and when an antenna provided for the transceiver 61 of the smart card 60 brought by the user detects such radio waves, an electric power is generated in the smart card 60, thereby securing power for driving the processor 63 (step S301). Then, communication between the smart card 60 and the coupon issuing device 10 is established through predetermined interactions therebetween (steps S302, S401).

Next, the coupon issuing device 10 performs similar processes to steps S101 to S103 shown in FIG. 2 to acquire a coupon ID from the coupon issuance control server 30 (step S402).

The coupon issuance manager 14 attaches a coupon issuance time and an issuing location (an ID uniquely given to the coupon issuing device 10 may be acceptable) to the acquired coupon ID and transmits such coupon information to the smart card 60 over radio waves emitted by the reader/writer 16 (step S403).

In the smart card 60, when the transceiver 64 receives the radio waves including the coupon information (step S303), the processor 63 writes the received coupon information into the memory 62 (step S304). Then, the user takes the smart card 60 to which the information is written by the coupon issuing device 10 in this manner and visits a store to exercise it.

Figure 12:
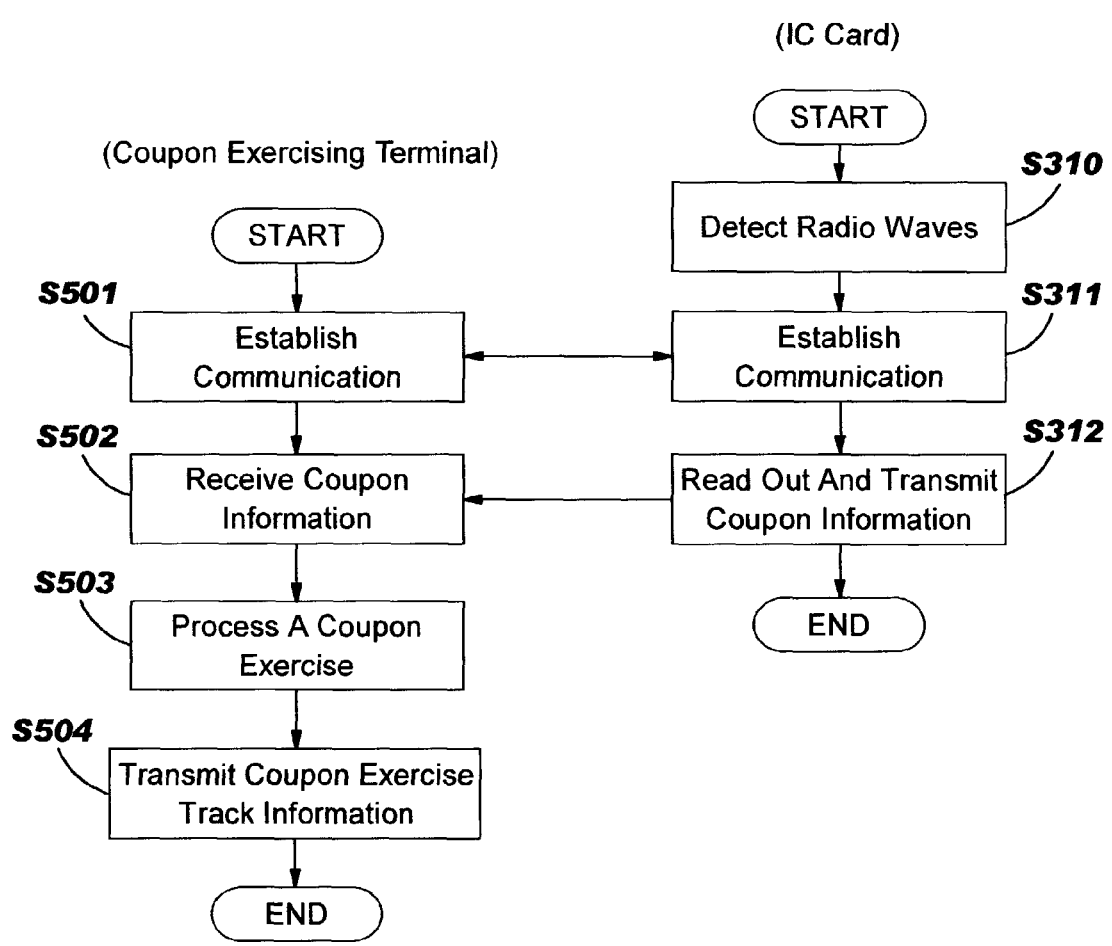
FIG. 12 shows the flow of process for exercising a coupon.

FIG. 12 shows the flow of process when the user exercises a coupon in a store. The user or a salesclerk brings the smart card 60 close to the coupon exercising terminal 20 provided in the store during the payment for goods. When the antenna in the transceiver 61 of the smart card 60 detects the radio waves emitted by an antenna in the transceiver 21 of the coupon exercising terminal 20, electric power is generated in the smart card 60, thereby securing power for driving the processor 63 (step S310). Then, communication between the smart card 60 and the coupon exercising terminal 20 is established through predetermined interactions therebetween (steps S311, S501).

Next, the coupon exercising terminal 20 requests the smart card 60 to read the coupon information through radio wave communications. Then, the smart card 60 causes the processor 63 to read the predetermined coupon information from the memory 62 and the transceiver 64 to transmit it to the transceiver 21 of the coupon exercising terminal 20 (step S312). The processor 63 may read not only the coupon information written by the coupon issuing device 10 but also user information (a member ID or other appropriately preset items of information) previously stored in the memory 62 and transmit the user information together with the coupon information.

In the coupon exercising terminal 20, when the transceiver 21 receives the coupon information (and the user information) read from the smart card 60 (step S502), the coupon exercising terminal 20 exercises the coupon for a discount process like in steps S202 to S203 of FIG. 3 (step S503) and transmits to the coupon issuance control server 30 the coupon information and, if necessary, the user information and some information on items the user purchased, as coupon exercise track information (step S504).

Thereafter, the coupon issuance control server 30 can change the privilege details of a coupon to be issued later based on the information transmitted by the coupon exercising terminal 20. The process performed by the coupon issuance control server 30 for that purpose is similar to those described for the examples of the first embodiment described above and will not be described in detail hereafter.

With the configuration described above, similar effects to those of the first embodiment can be achieved. In addition, the use of the smart card 60 possessed by the user as a coupon can eliminate the need for issuing a ticket-like coupon.

In the embodiment described above, the coupon information is recorded in the memory 62 of the smart card 60. A variation thereof wherein no information is recorded on the smart card 60 itself will be described below. For this purpose, unique information (a card ID or a user's member ID) uniquely given to the smart card 60 has been previously stored in the memory 62 of the smart card 60.

Figure 13:
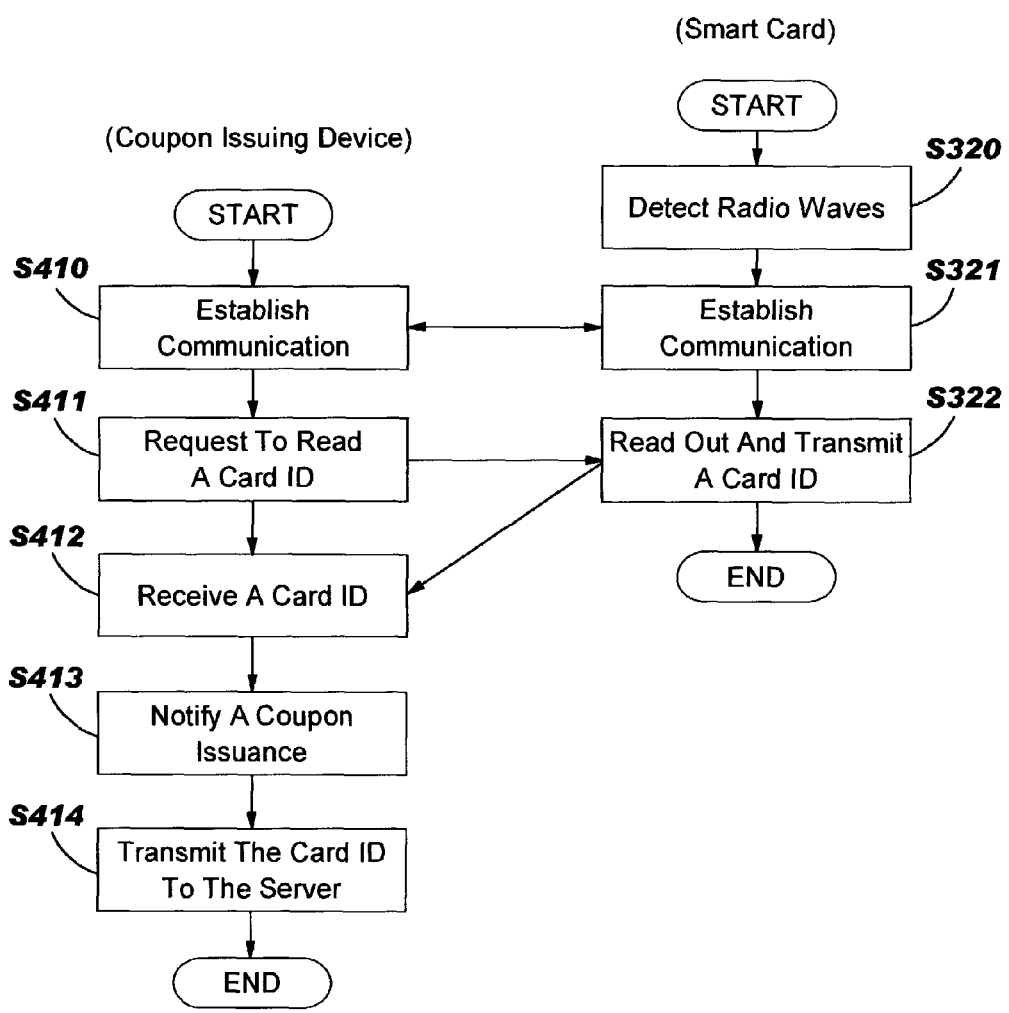
FIG. 13 shows the flow of process for issuing a coupon in a variation of the second embodiment.

As shown in FIG. 13, when a user who sees an advertisement displayed on the advertisement information display 12 wants the coupon issuing device 10 to issue a coupon, the user brings the user's own smart card 60 close to the reader/writer 16 of the coupon issuing device 10. When the smart card 60 detects radio waves emitted by the coupon issuing device 10, communication between the smart card 60 and the coupon issuing device 10 is established through predetermined interactions therebetween (steps S320, S321, S410).

Next, the coupon issuing device 10 requests the smart card 60 to read out the unique information such as a card ID (hereinafter simply referred to as card ID) (step S411).

Upon receipt of the request, the smart card 60 causes the processor 63 to read out the card ID from the memory 62 and the transceiver 64 to transmit it over radio waves (step S322).

When the coupon issuing device 10 receives the card ID transmitted by the smart card 60 (step S412), it provides an audio indication from an audio output (not shown) or a visual indication on the advertisement information display 12 in order to notify the user that a coupon has been issued (step S413).

In addition, the coupon issuing device 10 transmits the card ID acquired from the smart card 60 to the coupon issuance control server 30 through the network 50 (step S414).

Upon receipt of this, the coupon issuance control server 30 changes the status of the received card ID to "coupon issued" and stores that data in the coupon information DB 34.

Figure 14:
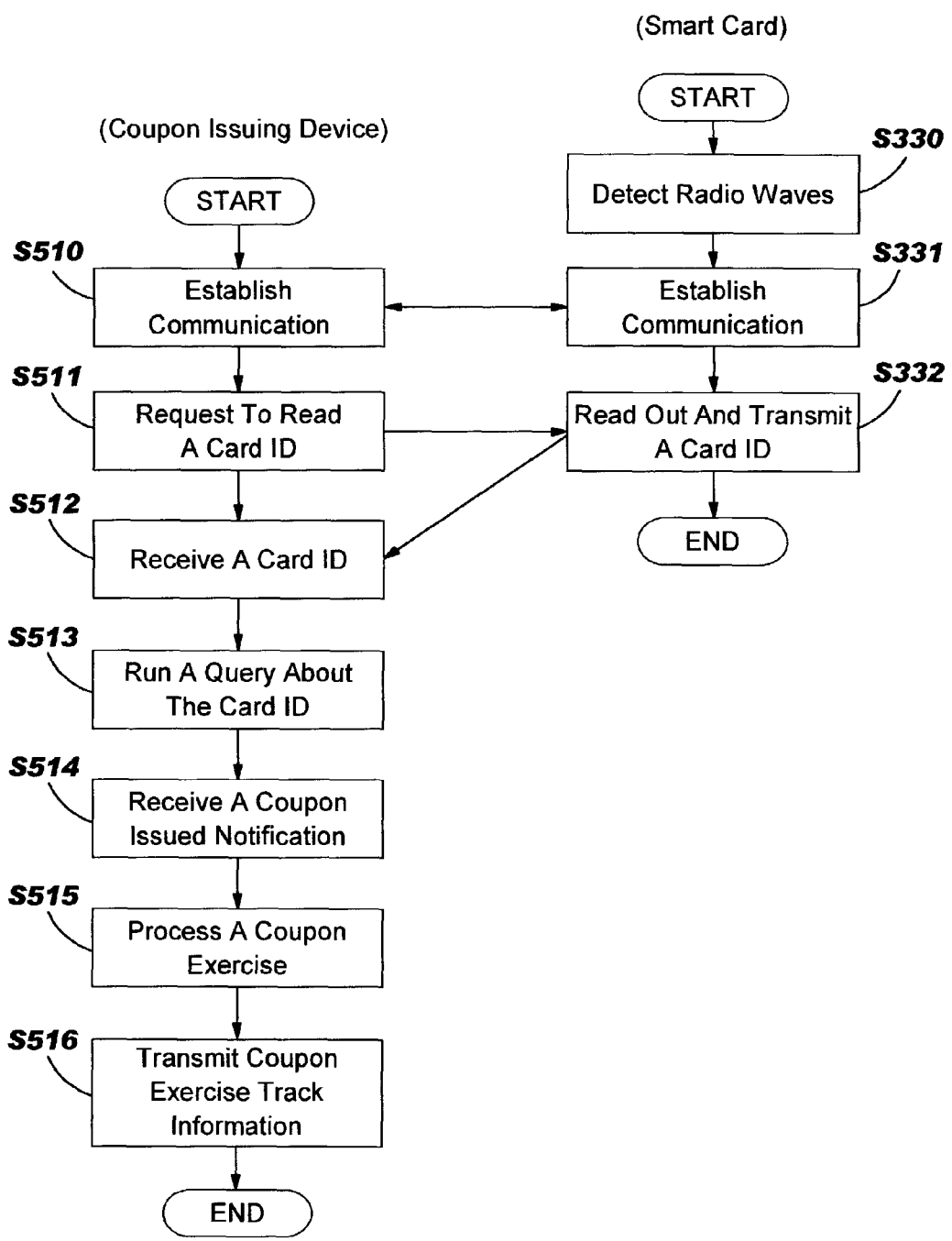
FIG. 14 shows the flow of process for exercising a coupon in a variation of the second embodiment.

Next, when the user takes the smart card 60 with which the above-described coupon issuance procedure has been performed at the coupon issuing device 10 in this manner and visits a store to exercise it, the process as shown in FIG. 14 is performed.

Namely, the user or a salesclerk brings the smart card 60 close to the coupon exercising terminal 20 provided in the store during the payment for goods. When the antenna in the transceiver 64 of the smart card 60 detects the radio waves emitted by the antenna in the transceiver 21 of the coupon exercising terminal 20, communication between the smart card 60 and the coupon exercising terminal 20 is established through predetermined interactions therebetween (steps S330, S331, S510).

Next, the coupon exercising terminal 20 requests the smart card 60 to read the card ID through radio communications (step S511). Then, the smart card 60 causes the processor 63 to read the predetermined card ID from the memory 62 and the transceiver 64 to transmit it to the transceiver 21 of the coupon exercising terminal 20 (step S332).

When the coupon exercising terminal 20 receives the card ID read out from the smart card 60 at the transceiver 21 (step S512), the coupon acceptance processor 22 of the coupon exercising terminal 20 runs a query about the card ID to the coupon issuance control server 30 through the network 50 (step S513).

Upon receipt of this query, the coupon issuance control server 30 causes the coupon exercise manager 32 to search the data in the coupon information DB 34 to check whether the status of the queried card ID is "coupon issued". As a result, if the status of the card ID is "coupon issued", the coupon issuance control server 30 transmits a notification to that effect through the network 50.

When the coupon exercising terminal 20 receives the coupon issued notification (step S514), it performs a predetermined process for discount through the exercise of the coupon in a manner similar to step S202 of FIG. 3 (step S515). Then, it transmits to the coupon issuance control server 30 a notification that the coupon has been exercised (step S516).

In the embodiment described above, the smart card 60 is used to store electronic data; however a magnetic card which can store magnetic data in a readable/writable manner may be used as well.

Next, yet another embodiment according to the present invention will be described below. As an example of this embodiment, the coupon is implemented by a terminal which can perform short-distance radio communications such as Bluetooth, for example, a Bluetooth-enabled cellular phone that is equipped with functions of a terminal. In this embodiment, the coupon issuing system has a similar basic configuration to that of the first embodiment described above. Consequently, the configuration necessary for use of a wireless terminal as a coupon will be described in the following description, where components similar to those of the first embodiment will be denoted with the same reference numerals but will not be described in detail.

As shown in FIG. 1, the coupon issuing system according to this embodiment comprises a coupon issuing device 10, a coupon exercising terminal 20, a coupon issuance control server 30, and an advertising contents management server 40, all of which can be connected through a network 50.

Figure 15A:
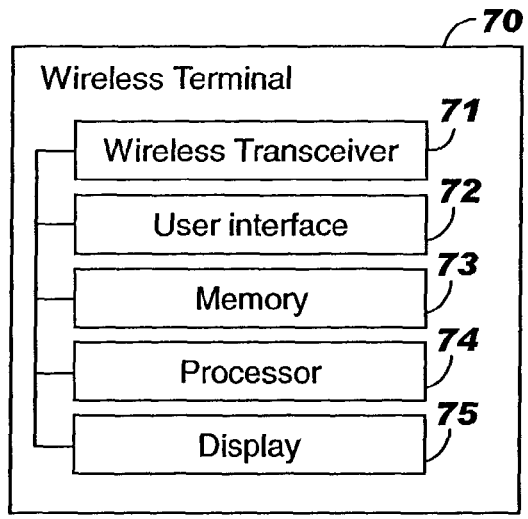
FIG. 15 shows the configuration of a wireless terminal, a coupon issuing device, and a coupon exercising terminal in a third embodiment.

As shown in FIG. 15A, a wireless terminal (recording medium with portability) 70 such as a Bluetooth-enabled cellular phone that is equipped with functions of a terminal which the user possesses comprises a transceiver 71 for performing radio communications, a user interface 72 such as buttons for allowing the user to perform various operations, a memory 73 for storing data, a processor 74 for performing a data read/write process for the memory 73, and a display 75 for displaying information to the user.

Figure 15B:
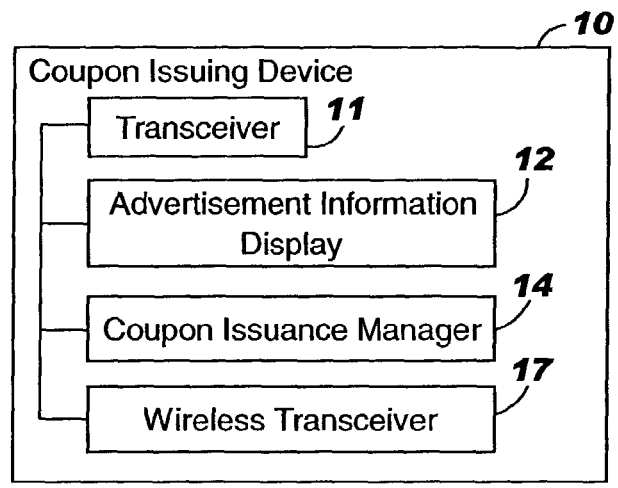

As shown in FIG. 15B, the coupon issuing device 10 comprises a wireless transceiver 17 for performing radio communications between the wireless terminal 70, in addition to a transceiver 11, an advertisement information display 12, and a coupon issuance manager 14.

Figure 15C:
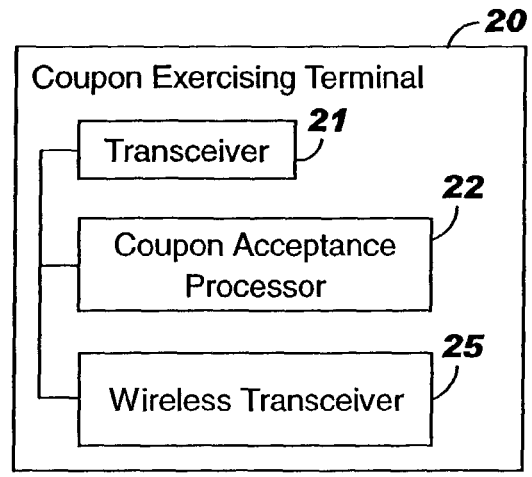

As shown in FIG. 15C, the coupon exercising terminal 20 comprises a wireless transceiver 25 for performing radio communications between the wireless terminal 70, in addition to a transceiver 21 and a coupon acceptance processor 22.

FIG. 16 shows the flow of a process for issuing a coupon at the coupon issuing device 10 in the coupon issuing system as described above.

First, when a user who sees an advertisement displayed on the advertisement information display 12 wants the coupon issuing device 10 to issue a coupon, the user performs an operation to make a coupon issuance request with the user interface 72 of the user's own wireless terminal 70 in proximity of the coupon issuing device 10 (step S601).

This operation causes the wireless terminal 70 to emit predetermined radio waves. When a response (radio waves) from the wireless transceiver 17 of the coupon issuing device 10 is detected in response thereto (step S602), communication between the wireless transceiver 71 of the wireless terminal 70 and the wireless transceiver 17 of the coupon issuing device 10 is established through predetermined interactions therebetween (steps S603, S701).

Next, the coupon issuing device 10 accepts the coupon issuance request from the wireless terminal 70 (step S702) and performs similar processes to steps S101 to S103 shown in FIG. 2 to acquire a coupon ID from the coupon issuance control server 30 (step S703).

The coupon issuance manager 14 attaches a coupon issuance time and an issuing location (an ID uniquely given to the coupon issuing device 10 may be acceptable) to the acquired coupon ID and transmits such coupon information over radio waves emitted by the wireless transceiver 17 (step S704).

In the wireless terminal 70, when the wireless transceiver 71 receives the radio waves including the coupon information (step S604), the processor 74 writes the received coupon information into the memory 73 (step S605). In addition, the wireless terminal 70 provides a message on the display 75 or an audio indication from an audio output (not shown) in order to notify the user that an issued coupon has been received (step S606).

Then, the user takes the wireless terminal 70 which receives the coupon issued by the coupon issuing device 10 in this manner and visits a store to exercise it.

Figure 17:
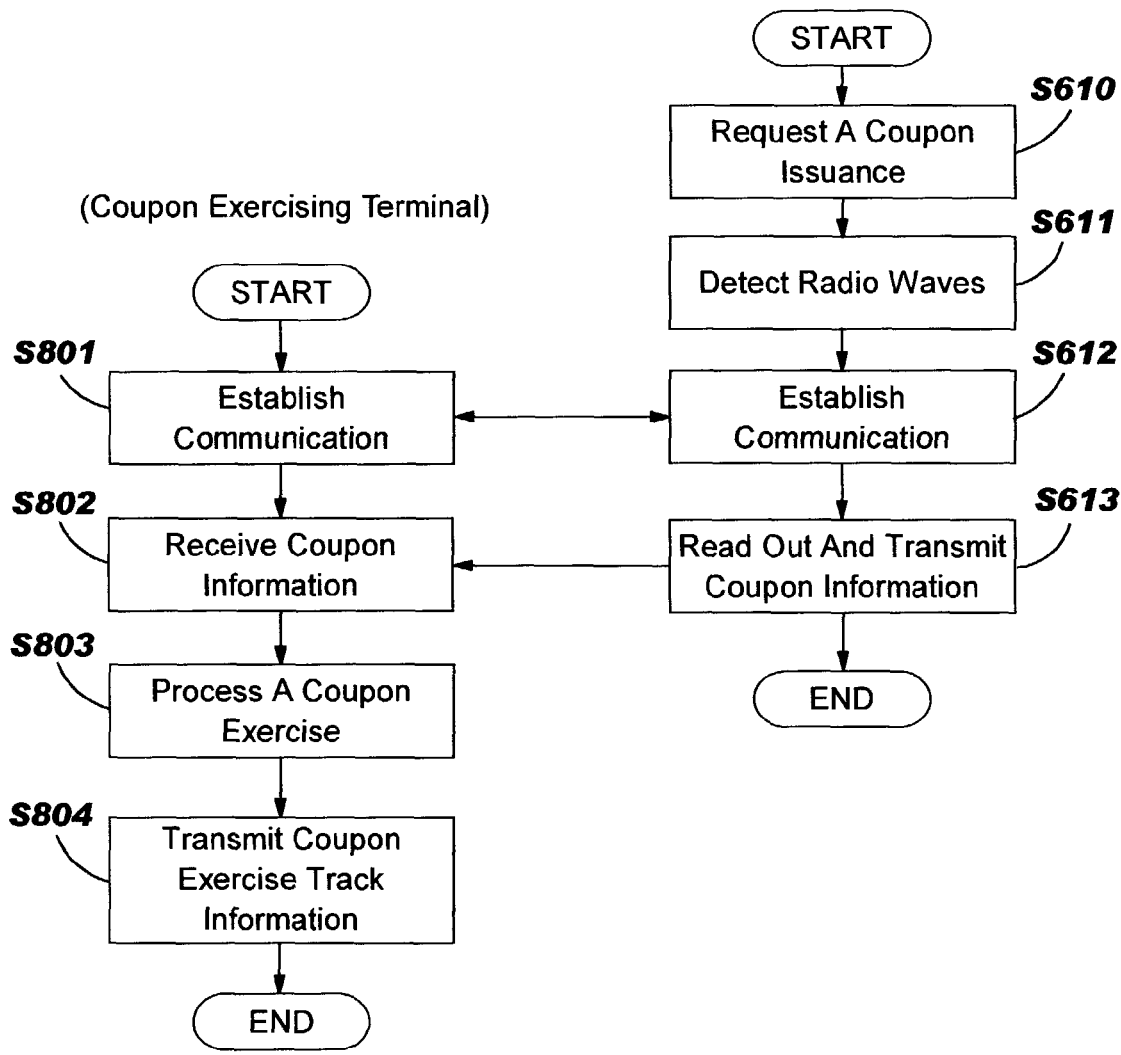
FIG. 17 shows the flow of process for exercising a coupon.

FIG. 17 shows the flow of a process when the user exercises a coupon in a store. The user performs a predetermined operation to have the coupon validated with the user interface 72 in proximity of the coupon exercising terminal 20 provided in the store during the payment for goods (step S610). This operation causes the wireless terminal 70 to emit predetermined radio waves. When a response (radio waves) from the wireless transceiver 25 of the coupon exercising terminal 20 is detected in response thereto (step S611), communication between the wireless transceiver 71 of the wireless terminal 70 and the wireless transceiver 17 of the coupon issuing device 10 is established through predetermined interactions therebetween (steps S612, S801).

Next, the wireless terminal 70 causes the processor 74 to read out the predetermined coupon information from the memory 73 and the wireless transceiver 71 to transmit it to the wireless transceiver 25 of the coupon exercising terminal 20 (step S613). The processor 74 may read out not only the coupon information acquired at the coupon issuing device 10 but also user information (a member ID or other appropriately preset items of information) previously stored in the memory 73 and transmit the user information together with the coupon information.

In the coupon exercising terminal 20, when the wireless transceiver 25 receives the coupon information (and the user information) read out from the wireless terminal 70 (step S802), the coupon exercising terminal 20 exercises the coupon for a discount process as in steps S202 to S203 of FIG. 3 (step S803) and transmits to the coupon issuance control server 30 the coupon ID, the coupon issuance time, and the issuing location and, if necessary, the user information and some information on items the user purchased (step S804).

Thereafter, the coupon issuance control server 30 can change the privilege details of a coupon to be issued later based on the information transmitted by the coupon exercising terminal 20. The process performed by the coupon issuance control server 30 for that purpose is similar to those described for the examples of the first embodiment described above and will not be described in detail hereafter.

With the configuration described above, similar effects to those of the first embodiment can be achieved. In addition, the use of the wireless terminal 70 possessed by the user as a coupon can eliminate the need for issuing a ticket-like coupon.

In the embodiment described above, the user uses the wireless terminal 70 to transfer the coupon information between the coupon exercising terminal 20 in a store through radio communications. However, this embodiment is not necessarily limited to such usage of the wireless terminal. For example, the user may simply perform a predetermined operation with the user interface 72 of the wireless terminal 70 to display the coupon information on the display 75 and present it to a salesclerk of the store. Then, the salesclerk to which the information is presented will perform a predetermined operation with a cash register to allow the user to enjoy the coupon privilege.

Alternatively, for example, the user may perform another predetermined operation with the user interface 72 of the wireless terminal 70 to display the coupon information as a two-dimensional bar-code on the display 75 and cause the coupon exercising terminal 20 to read the bar code. Then, the coupon exercising terminal 20 will determine whether the coupon information is valid and, if valid, a predetermined operation will be performed with a cash register to allow the user to enjoy the coupon privilege.

In the embodiment described above, the coupon information is recorded in the memory 73 of the wireless terminal 70.

A variation of this embodiment wherein no information is recorded on the wireless terminal 70 itself will be described below.

For this purpose, the user who possesses the wireless terminal 70 has been previously registered as a community member at a particular website, as a member at a particular store or store chain, or as a member for a particular credit card, and the member ID information uniquely given to such a member has been stored in user information DB 35 of the coupon issuance control server 30.

As shown in FIG. 18, when a user who sees an advertisement displayed on the advertisement information display 12 wants the coupon issuing device 10 to issue a coupon, the user performs an operation to make a coupon issuance request with the user interface 72 of the user's own wireless terminal 70 in proximity of the coupon issuing device 10 (step S620).

This operation causes the wireless terminal 70 to emit predetermined radio waves. When a response (radio waves) from the wireless transceiver 17 of the coupon issuing device 10 is detected in response thereto (step S621), communication between the wireless transceiver 71 of the wireless terminal 70 and the wireless transceiver 17 of the coupon issuing device 10 is established through predetermined interactions therebetween (steps S622, S710).

Next, the coupon issuing device 10 transmits a signal to request the wireless terminal 70 to enter the member ID (step S711).

Upon receipt of the request (step S623), the wireless terminal 70 causes the processor 74 to display a message on the display 75 to prompt the user to enter the member ID (step S624).

When the user sees the message displayed on the display 75, the user enters his or her member ID with the user interface 72. Then, the wireless terminal 70 accepts it and transmits the entered member ID over radio waves from the wireless transceiver 71 (step S625).

When the coupon issuing device 10 receives the member ID transmitted by the wireless terminal 70 (step S712), it notifies the coupon issuance control server 30 through the network 50 of the received member ID (step S713). Upon receipt of this, the coupon issuance control server 30 checks whether any data on the received member ID has been stored in the user information DB 35 and if it is properly checked, the coupon issuance control server 30 changes the status of the member ID to "coupon issued" and stores that data in the coupon information DB 34.

The coupon issuing device 10 returns a predetermined signal to the wireless terminal 70 to notify the user that the coupon has been issued. Upon receipt of this signal, the wireless terminal 70 causes the display 75 to display a predetermined notification that the coupon has been issued.

Next, when the user takes the wireless terminal 70 with which the above-described coupon issuance procedure has been performed at the coupon issuing device 10 in this manner and visits a store to exercise it, the process as shown in FIG. 19 is performed.

Namely, the user performs a predetermined operation to request a coupon exercise with the user interface 72 of the user's own wireless terminal 70 in proximity of the coupon exercising terminal 20 provided in the store during the payment for goods (step S630).

This operation causes the wireless terminal 70 to emit predetermined radio waves. When a response (radio waves) from the wireless transceiver 25 of the coupon exercising terminal 20 is detected in response thereto (step S631), communication between the wireless transceiver 71 of the wireless terminal 70 and the wireless transceiver 25 of the coupon exercising terminal 20 is established through predetermined interactions therebetween (steps S632, S810).

Next, the coupon exercising terminal 20 accepts the coupon exercise request made by the wireless terminal 70 (step S811) and transmits a signal to request the wireless terminal 70 to enter the member ID (step S812).

Upon receipt of the request (step S633), the wireless terminal 70 causes the processor 74 to display a message on the display 75 to prompt the user to enter the member ID (step S634).

When the user sees the message displayed on the display 75, the user enters his or her member ID with the user interface 72. Then, the wireless terminal 70 accepts it and transmits the entered member ID over radio waves from the wireless transceiver 71 (step S635).

When the coupon exercising terminal 20 receives the member ID transmitted by the wireless terminal 70 (step S813), it runs a query about the received member ID to the coupon issuance control server 30 through the network 50 (step S814). Upon receipt of this query, the coupon issuance control server 30 causes the coupon exercise manager 32 to search the data in the coupon information DB 34 to check whether the status of the queried member ID is "coupon issued". As a result, if the status of the member ID is "coupon issued", the coupon issuance control server 30 transmits a notification to that effect through the network 50.

When the coupon exercising terminal 20 receives the coupon issued notification (step S815), it performs a process for discount through the exercise of the coupon in a manner similar to step S202 of FIG. 3 (step S816). Then, it transmits to the coupon issuance control server 30 a notification that the coupon has been exercised (step S817).

In the embodiments described above, the coupon issuance control server 30 and the advertising contents management server 40 are provided separately; they may, however, be integrated into a single unit without any trouble.

In the embodiments described above, the coupon issuing device 10 is assumed to be provided on a street. The invention is not necessarily limited to this particular configuration. For example, the coupon issuing device 10 may be a PC, a personal digital assistant, or a cellular phone that is equipped with functions of a terminal possessed by the user. Then, the advertisement information display 12 may be implemented by a PC monitor and advertisements to be displayed thereon may include banner advertisements. The coupon issuer 13 may be a printer connected to the PC. If a personal digital assistant or a cellular phone is used, the issuance of a coupon can be completed by transmitting coupon information to such a terminal.

Furthermore, the embodiments described above are configured to cause the advertisement information display 12 to display advertising contents to the user. Such display of advertising contents is not essential to the invention, however, and they may be configured only to issue coupons.

In addition, a coupon itself may perform functions other than as a numbered ticket or discount coupon.

In the embodiments described above, a coupon has its coupon ID described thereon. If all users presenting coupons can enjoy a uniform discount, however, such a coupon ID is not required. Then, the coupon exercising terminal 20 is not required to read the coupon ID and other information, and a salesclerk to whom the coupon is presented may operate predetermined buttons on a cash register to perform a discount process.

Other variations or modifications may be made or other choices may be made among various configurations in the above-described embodiments, without departing from the range and sprit of the present invention.

DESCRIPTION OF SYMBOLS

10 . . . Coupon issuing device (privilege information output means, privilege information output terminal)
12 . . . Advertisement information display (contents display, details information display, electronic advertising display)
13 . . . Coupon issuer (privilege information output, additional information output)
14 . . . Coupon issuance manager (details information acquirer)
15 . . . User interface (information input)
16 . . . Reader/writer
17 . . . Wireless transceiver
20 . . . Coupon exercising terminal (privilege information acceptance means, privilege information accepting terminal)
21 . . . Transceiver (notifying section)
22 . . . Coupon acceptance processor (privilege information accepting section, process executor)
23 . . . Coupon information read section
24 . . . Reader/writer
25 . . . Wireless transceiver
30 . . . Coupon issuance control server (output control means, external server, privilege information output control server)
31 . . . Transceiver (data output)
32 . . . Coupon exercise manager (information acquirer)
33 . . . Coupon details change processor (data updater)
34 . . . Coupon information DB (additional information data holder, data holder)
35 . . . User information DB
40 . . . Advertising contents management server
42 . . . Advertising contents edit processor
43 . . . Advertising contents DB (contents data holder)
50 . . . Network
60 . . . Smart card (recording medium with portability)
61 . . . Ticket
62 . . . Memory
64 . . . Transceiver for smart card
70 . . . Wireless terminal (recording medium with portability)
72 . . . User interface
73 . . . Memory

We claim:

1. A ticket information output control method, said method comprising:
   receiving, by a coupon issuing device from a user, a request for a coupon pertaining to purchasing an item of goods;
   after said receiving the request for the coupon, said coupon issuing device requesting, from a coupon issuance control server, a coupon identifier (ID) for identifying the coupon;
   said coupon issuing device receiving the coupon ID from the coupon issuance control server in response to the request for the coupon ID;
   after said receiving the request for the coupon, said coupon issuing device requesting from the user information pertaining to the user;
   said coupon issuing device receiving the information pertaining to the user from the user in response to the request for the information pertaining to the user;
   said coupon issuing device incorporating, into the coupon, ticket information corresponding to the item, said ticket information comprising the coupon ID, the information pertaining to the user, and a current discount for discounting the item's purchase price; and
   after said incorporating the ticket information, issuing to the user by the coupon issuing device, the coupon comprising the ticket information corresponding to the item, said ticket information for determining an order of purchasing said item; and
   controlling issuance of subsequent ticket information and display of item availability information by displaying, by a display device comprised by the coupon issuing device, item availability information that includes a number of remaining exercisable coupons currently available for purchasing the item.

2. The method of claim 1, said method further comprising:
   after said receiving the request for the coupon, said coupon issuing device sending a request for a specification of the current discount from the coupon issuance control server; and
   after said sending the request for the current discount, said coupon issuing device receiving the specification of the current discount from the coupon issuance control server.

3. The method of claim 1, said method further comprising:
   before said receiving the request for the coupon, said coupon issuing device receiving a specification of the current discount from an advertising contents management server and displaying the current discount to the user.

4. The method of claim 3, said method comprising:
   said coupon issuing device displaying simultaneously the current discount, the previous discount, and a number of remaining exercisable coupons for purchasing the item.

5. The method of claim 1, said method further comprising:
   said coupon issuing device further incorporating into the coupon: a time and location of issuance of the coupon.

6. The method of claim 1, said method further comprising:
   said coupon issuing device translating, into bar codes or optical character reader (OCR) compatible characters, the coupon ID, the time of issuance, and the place of issuance, wherein said incorporating results in the translated coupon ID, the translated time of issuance, and the translated place of issuance being incorporated into the coupon.

7. The method of claim 1, wherein the information pertaining to the user that is incorporated into the coupon comprises the user's name, address, telephone number.

8. The method of claim 1, wherein the information pertaining to the user that is incorporated into the coupon further comprises the user's age and gender.

9. A coupon issuance control server which controls an output of privilege information corresponding to a plurality of items, comprising:
   a coupon information database for holding privilege information data and item availability data, said privilege information data being a discount for discounting a purchase price of an item of goods comprised by the plurality of items;
   a transceiver for providing an output of said privilege information data and said item availability data held in said coupon information database to an external device; and
   a coupon details change processor for updating details of said privilege information data and said item availability data held in said coupon information database based on an exercise status of said privilege information provided by said transceiver;
   said coupon issuance control server configured to perform a method for controlling the output of privilege information, said method comprising:

said coupon issuance control server receiving notification that a user has exercised a coupon for purchasing the item, of information identifying the user, and of a coupon identifier (ID) that identifies the coupon, wherein the discount is incorporated into the coupon;

in response to said received notification, said coupon issuance control server incrementing a coupon count of coupons exercised for purchase of the item;

after said incrementing, said coupon issuance control server calculating a number of remaining exercisable coupons for purchasing the item by subtracting the coupon count from a preset number of coupons; and said coupon issuance control server transmitting the calculated number of remaining exercisable coupons to an advertising contents management server to facilitate display of the number of remaining exercisable coupons to users requesting coupons for purchase of the item, wherein said item availability data includes real-time information as to the calculated number of said remaining exercisable coupons currently available for purchasing the item.

10. The coupon issuance control server of claim 9, said method further comprising:

after said incrementing, said coupon issuance control server changing the discount based on the coupon count.

11. The coupon issuance control server of claim 10, said method further comprising:

said coupon issuance control server changing the discount based on a time of day when the coupon was exercised by the user and an elapsed time since the coupon was issued.

12. The coupon issuance control server of claim 10, wherein a time of issuance of the coupon is incorporated into the coupon, and wherein the method further comprises said coupon issuance control server changing the discount based on the time of issuance of the coupon.

13. The coupon issuance control server of claim 10, wherein a time of issuance of the coupon is incorporated into the coupon, and wherein the method further comprises said coupon issuance control server changing the discount based on a purchase history for a group of users to which the coupon is issued.

14. The coupon issuance control server of claim 10, wherein the method further comprises:

said coupon issuance control server determining that a specified time has elapsed since a time of issuance of the coupon; and said coupon issuance control server increasing the discount in response to said determining that the specified time has elapsed.

15. The coupon issuance control server of claim 9, wherein a location of issuance of the coupon is incorporated into the coupon.

16. The coupon issuance control server of claim 9, wherein the information identifying the user received by the coupon issuance control server comprises a credit card number identifying the user.

* * * * *